3,378,566
CERTAIN 5-(R-R₁-R₂-METHYL)-7-(R₃-R₄-METH-YLENE) - (R₆) - 5 - NORBORNENE - 2,3 - DI-CARBOXIMIDES
Richard Joseph Mohrbacher, Fort Washington, George Ireland Poos, Ambler, and Adolph P. Roszkowski, Willow Grove, Pa., assignors to McNeil Laboratories, Incorporated, a corporation of Pennsylvania
No Drawing. Continuation-in-part of application Ser. No. 350,541, Mar. 9, 1964. This application Mar. 10, 1966, Ser. No. 533,261
23 Claims. (Cl. 260—295)

This is a continuation-in-part application of copending application Ser. No. 350,541, filed Mar. 9, 1964, now abandoned, which in turn was a continuation-in-part application of application Ser. No. 261,508, filed Feb. 27, 1963, now abandoned.

This invention relates to a new series of organic compounds generally definable as 5-(R-R₁-R₂-methyl)-7-(R₃-R₄ - methylene) - N-R₅-5-norbornene-2,3-dicarboximides; the corresponding norbornane - 2,3 - dicarboximides; the corresponding 7-(R₃-R₄-methyl) norbornene(-ane) compounds; the corresponding norbornene(-ane)-2,3-dicarboxylic acids and anhydrides; the corresponding amide derivatives and lower alkyl esters of said norbornene (-ane)-2,3-dicarboxylic acids; and the foregoing compounds wherein said norbornene(-ane) rings are further substituted with halo or lower alkyl substitutents. The invention is also concerned with acid addition salts, quaternary ammonium compounds and N-oxide derivatives of the foregoing compounds containing a basic nitrogen atom.

The nomenclature employed for the compounds of this invention is based upon the norbornane nucleus, which may be represented in either of the following ways:

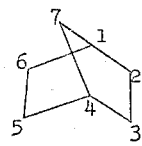    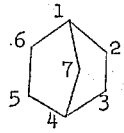

(I)                        (II)

The dicarboximides of this invention and the corresponding anhydrides may be represented as follows:

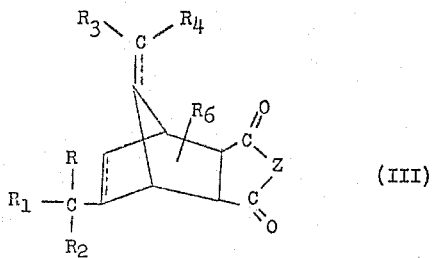

(III)

In the above formula, the dotted lines between the 5- and 6-carbon atoms of the norbornane nucleus and between the 7-carbon atom of the norbornane nucleus and the C(R₃)(R₄) substituent thereon indicate that a double bond is optional. R represents hydrogen, hydroxy and lower alkoxy, preferably, methoxy.

R₆ represents hydrogen, lower alkyl or halo. In the preferred embodiments of this invention, R₆, when lower alkyl or halo, is located in at least one of the 2-, 3- or 6-positions of the norbornene(-ane) nucleus. Z represents oxygen or N-R₅, said R₅ being hereinafter defined. R₁ and R₃ are each a member selected from the group consisting of lower alkyl, heterocyclic aryl, phenyl and substituted phenyl, and R₂ and R₄ are each a member selected from the group consisting of heterocyclic aryl, phenyl and substituted phenyl, said substituted phenyl having one or more substituents attached to it; provided, however, that when R₁ is lower alkyl, R is other than hydrogen.

Typical substituents on said substituted phenyl include, for example, a lower alkyl; a hydroxy; an etherified hydroxy group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like; and an esterified hydroxy such as a lower alkyl-carbonyl-oxy or aryl-carbonyl-oxy. Said substitutent may also be a nitro group; a halogen, such as chlorine, bromine, fluorine or iodine; an amino group or a substituted amino group, representative examples of which are acylamino, lower alkoxy-carbonyl-amino, lower alkylamino, lower dialkylamino, amidino, hydrazino or a substituted hydrazino, and sulfonated amino. Furthermore, said substituent may be a mercapto or a substituted mercapto radical of the type exemplified by alkylthio groups such as methylthio, ethylthio, and propylthio and arylthio or aralkylthio groups, e.g., benzylthio and phenylthio. The phenyl radical may, if desired, be haloalkylated, as with a chloromethyl, trifluoromethyl, trifluoroethyl, perfluoroethyl, β-chloroethyl or like substituent; or acylated as with acetyl, propionyl, benzoyl, phenylacetyl, trifluoroacetyl and like acyl groups. In addition, the invention embraces compounds wherein the phenyl radical contains a sulfamyl, benzylthiomethyl or cyano radical. Further, it may contain a carboxy substituent, or a derivative thereof, such as an alkali metal salt or a lower alkyl ester or substituted lower alkyl ester of the carboxy radical, amide, hydrazide and the like. It should be stressed that substituents other than those specifically referred to above may be present in the phenyl component of the compounds of this invention, and, when said phenyl component is polysubstituted, the substituents may be the same or different, said invention being one that contemplates substitutents broadly in this portion of the molecule, the only limitation being that imposed by the methods available for introducing and maintaining various types of substituents on the phenyl component.

Heterocyclic aryl groups comprise five- to ten-membered heteroaromatics wherein the hetero atoms are one or more thia, aza or oxa atoms. Included are monocyclic heteroaryls comprising five- to six-members having at least one sulfur, nitrogen or oxygen atom as the heteratom, and bicyclic heteroaryls having up to ten members and having, as one of the cyclic moieties, a five- to six-membered heteroaromatic ring with at least one sulfur, nitrogen or oxygen atom as the heteroatom. Specific examples of such groups are pyridyl, quinolyl, imidazolyl, pyrazinyl, pyrrolyl, thienyl, furanyl, thiazolyl, thiadiazolyl, pyrazolyl, triazolyl, oxazolyl and pyrimidinyl. Preferably, the heterocyclic aryl group comprises a six-membered heterocyclic with a sole nitrogen as the heteroatom. The azaheterocyclic aryls may be, if so desired, further substituted at the ring carbon and nitrogen atoms. For example, the heterocyclic moiety may be substituted with a lower alkyl, e.g., 6-methyl-2-pyridyl, 4-ethyl-2-pyrimidyl and the like; or, for example, a 2-pyrrolyl moiety may be alkylated to the corresponding N-alkyl-2-pyrrolyl. Further, the carbon-heterocyclic aryl linkage may be at any one of the several carbon atoms of the heterocycle as, for example, at the 2, 3, or 4-positions of the pyridyl moiety.

A basic nitrogen in the subject compounds, for example, the nitrogen atom of the azaheterocyclics, provides a basis for obtaining the corresponding acid addition salts, quaternary ammonium compounds and N-oxides of this invention. The acid addition salts may be prepared by reaction with an appropriate acid, as for example an inorganic acid such as a hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxy-benzoic or 2-acetoxy-benzoic acid.

Quaternary ammonium compounds may be prepared by reaction of the tertiary bases with alkylating agents, i.e. alkyl, alkenyl or aralkyl halides or esters formed by reacting alkanols with an oxygen-containing acid, such as methyl iodide, ethyl bromide, propyl chloride; allyl bromide; benzyl chloride; or di-lower alkyl sulfates—dimethylsulfate, diethylsulfate; lower alkyl arylsulfonates— methyl p-toluenesulfonate. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, lower alkanols such as ethanol, propanol, or butanol; or organic acid amides such as formamide or dimethylformamide. When lower alkyl halogenides are used as quaternizing agents, diethylether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono lower alkyl sulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

Oxidation of a basic nitrogen such as in the azaheterocyclic aryls, for example, with aqueous hydrogen peroxide in glacial acetic acid, yields the corresponding amine oxide. For example, a 2-pyridyl group in the $R_1$, $R_2$, $R_3$ or $R_4$ positions of the subject compounds may be oxidized to the corresponding 2-pyridyl-1-oxide by treatment with 30% aqueous hydrogen peroxide at 70–80° C. in glacial acetic acid.

The dicarboximides, which are the preferred embodiments of this invention, may be represented by the following formula:

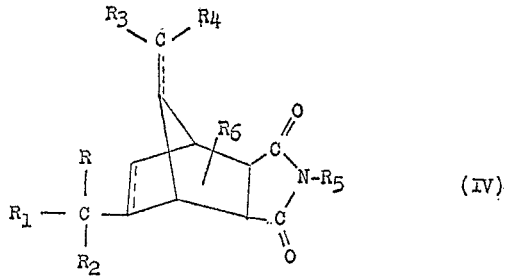

and may be denoted as 5-(R-$R_1$-$R_2$-methyl)-7-[$R_3$-$R_4$-methyl(-ene)]-($R_6$)-N-$R_5$-5-norbornene(-ane) - 2,3 - dicarboximides, wherein R, $R_1$, $R_2$, $R_3$, $R_4$ and $R_6$ and the meaning of the dotted lines are as previously described. For example, they may be denoted as 5-(R-$R_1$-$R_2$-methyl)-7-($R_3$-$R_4$-methyl)-($R_6$)-N-$R_5$-5 - norbornane - 2,3 - dicarboximides when both (1) the $C_5$-$C_6$ bond and (2) the bond between $C_7$ and the $R_3$-$R_4$-methyl substituent thereon are saturated; as 5-(R-$R_1$-$R_2$-methyl)-7-($R_3$-$R_4$-methyl)-($R_6$-N-$R_5$-5-norbornene-2,3-dicarboximides when bond (1) is unsaturated and bond (2) is saturated; as 5-(R-$R_1$-$R_2$-methyl)-7-($R_3$-$R_4$-methylene)-($R_6$)-N-$R_5$ - 5 - norbornane-2,3-dicarboximides when bond (1) is saturated and bond (2) is unsaturated; and as 5-(R-$R_1$-$R_2$-methyl)-7-($R_3$-$R_4$-methylene)-($R_6$)-N-$R_5$-5 - norbornene - 2,3-dicarboximides when bond (1) and bond (2) are unsaturated. Similar terminology may be utilized with the anhydrides and other compounds of this invention.

In the dicarboximide series, the dicarboximide nitrogen atom may be unsubstituted, i.e., $R_5$ is hydrogen, or substituted, e.g., $R_5$ may be alkyl, preferably lower alkyl; cycloalkyl, such as cyclopropyl, cyclopentyl and cyclohexyl; aryl-cycloalkyl, such as phenyl-cyclopropyl; and a substituted lower alkyl. Among the substituted lower alkyls that are operable herein are cycloalkyl-lower alkyl, such as cyclopropyl-butyl, cyclohexyl-ethyl and the like; aralkyl, such as benzyl, phenethyl and the like including substituted aralkyls having a substituent as heretofore described for $R_1$, $R_2$, $R_3$ and $R_4$; lower alkoxy-lower alkyl, such as methoxymethyl, methoxyethyl, ethoxymethyl and the like, preferably β-methoxyethyl; aryloxy-lower alkyl, such as phenoxymethyl, phenoxyethyl and the like; lower alkoxy-carbonyl-lower alkyl; di-(lower alkyl)aminocarbonyl-lower alkyl; aryloxy-carbonyl-lower alkyl; hydroxy-lower alkyl; halo-lower alkyl; cyano-lower alkyl; lower alkyl-carbonyl-lower alkyl; aryl-carbonyl-lower alkyl, such as phenacyl; carbamoyl-lower alkyl and N-substituted carbamoyl-lower alkyl; ureido-lower alkyl and substituted ureido-lower alkyl; amino-lower alkyl and substituted amino-lower alkyl, such as aminoethyl and aminobutyl, lower alkylamino-lower alkyl, e.g., methylamino-propyl, ethylamino-ethyl, etc., di-lower alkylamino-lower alkyl, e.g., dimethylamino-propyl, diethylaminoethyl, ethyl-sec.-butylamino-ethyl, etc., alkanolaminolower alkyl, e.g., ethanolamino-butyl, diethanolaminoethyl, etc., arylamino-lower alkyl, e.g., anilino-ethyl, diphenylamino-isopropyl, etc., mixed aliphatic-aromatic amino-lower alkyl, e.g., N-methylanilino-lower alkyl, etc. aralkylamino-lower alkyl, e.g., benzylamino-lower alkyl, β-phenylethylamino-lower alkyl, etc., halo-substituted aliphatic or aromatic amino-lower alkyl, e.g., β-chloroethylamino-lower alkyl, para-chloroanilino-lower alkyl, para-chlorobenzylamino-lower alkyl, etc., cyclic amino-lower alkyl, preferably mono-azaheterocyclic-lower alkyl, e.g., morpholino-lower alkyl, pyrrolidino-lower alkyl, piperidino-lower alkyl, morpholinyl-lower alkyl, piperidyl-lower alkyl, pyrryl-lower alkyl, quinolyl-lower alkyl, etc.; aliphatic and aromatic acyloxy-lower alkyl, e.g., acetoxyethyl, benzoyloxy-ethyl, etc.; and half esters of dibasic acids, such as a hemisuccinate. In addition $R_5$ may be an unsaturated hydrocarbon such as lower alkenyl, e.g., vinyl, allyl, 2-butenyl and the like; aralkenyl, e.g., styryl; and lower alkynyl, e.g., ethynyl, propargyl and the like. $R_5$ is not limited to the foregoing classes of substituents, however, and may also represent such substituents as hydroxy; lower alkoxy; aralkoxy; aryloxy; acyloxy, such as lower alkyl-carbonyl-oxy and aralkyl-carbonyl-oxy; lower alkyl-carbonyl; aryl-carbonyl, e.g., benzoyl; lower alkoxy-carbonyl; aryloxy-carbonyl; aralkoxy-carbonyl; carbamoyl and N-substituted carbamoyl; nitro; cyano; amino and substituted amino such as above described for substituted amino-lower alkyl; ureido and substituted ureido; and phenyl and substituted phenyl, such as, for example, phenyl having a substituent as heretofore described for $R_1$, $R_2$, $R_3$, and $R_4$. $R_5$ substituents other than those specifically referred to above may be attached to the dicarboximide nitrogen atom, this invention being one that contemplates substituents broadly in limitation being that imposed by the methods available for introducing and maintaining various types of substituents on the imido nitrogen.

As used herein, lower alkyl and lower alkoxy may be straight or branch chained and have from 1 to 7 carbon atoms, such as, for example, methyl, ethyl, propyl, isopropyl, butyl, isobutyl, tertiary-butyl, pentyl, hexyl, heptyl and the like and the corresponding methoxy, ethoxy, proöxy, isopropoxy, butoxy, etc.; cycloalkyl stands for a cyclic alkyl of from 3 to 8 carbon atoms; halo stands for chloro, fluoro, bromo and iodo; and aryl is preferably phenyl or substituted phenyl.

The compounds of this invention, and preferably in the form of their acid addition salts, quaternary ammonium compounds and N-oxides of the azaheterocyclics described heretofore, absorb ultra-violet (U.V.) light and are useful as U.V.-screening materials. Because of their solubility in organic materials generally, they may be used as U.V.-absorbers in plastics and resins, such as polystyrene, polyethylene, polypropylene, polyacrylics (methacrylate resins, polyacrylamides, polyacrylonitrile fibers), polyamide fibers (nylon, e.g.) and polyester fibers. In the latter use, the inclusion of 0.01 to 5% of the absorber, based on the polymer weight, is usually sufficient to render protection against ultra-violet light, such as in plastic films or light filters. The absorber may be incorporated in the mixture of monomers before polymerization to form the polymer or it may be incorporated in the polymer at any stage during its handling, as by milling into the polymer together with other compounding ingredients or during the spinning of polymers into fibers, etc.

In addition, many of the novel compounds herein possess valuable pharmacological properties such as antiarrhythmic or rodenticidal activity. At doses of from about 5 to about 20 milligrams per kilogram body weight intravenously, for example, they revert ouabain- and aconitine-induced arrhythmias.

Another and most unusual property possessed by certain compounds of this invention is a high degree of toxicity which is species-specific, i.e., a selective toxicity towards genus Rattus is observed. In rats, the $LD_{50}$ (lethal dose, 50% kill) of 5-[α-hydroxy-α-phenyl-α-(2-pyridyl)-methyl] - 7 - (phenyl - 2 - pyridylmethylene) - 5 - norbornene-2,3-dicarboximide (mixed stereoisomers) is about 5–10 milligrams per kilogram body weight when administered orally. In contradistinction, by the same route of administration, at considerably higher dose levels, for example, up to 1000 mg./kg. body weight, the same compound is relatively nontoxic in dogs, mice, birds, fish and other animals. The species-specific rodenticidal property is particularly applicable to the norbornene-2,3-dicarboximides as a class which are substituted by at least one pyridyl group at one of the 5-methyl- or 7-methylenepositions. It is intended that discovery of this completely unexpected and surprising raticidal property of the novel norbornene-2,3-dicarboximides be included within the scope of the present invention. The preferred raticidaily-active compounds may be described by the formula:

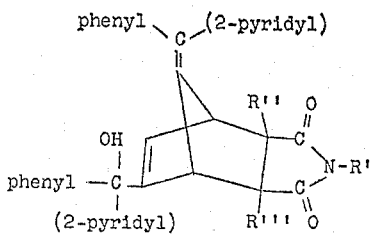

wherein R′ is a member selected from the group consisting hydrogen, lower alkyl preferably other than tertiary-lower alkyl, lower alkenyl, and substituted lower alkyl in which the substituent is lower alkoxy, di(lower alkyl)-amino and di-(lower alkyl)-amino-carbonyl; and R″ and R‴ are each a member selected from the group consisting of hydrogen, lower alkyl and halo, provided that at least one of said R″ and R‴ is hydrogen; and the corresponding acid addition salts thereof. In Table I below, the $LD_{50}$ of several such raticidally-active norbornene-2,3-dicarboximides are listed. In addition, when R′ is methyl and one of said R″ and R‴ is methyl, the other being hydrogen, the respective $LD_{50}$ of the corresponding dimethyl derivative of 5-[α-hydroxy-α-phenyl-α-(2-pyridyl) - methyl] - 7 - (phenyl - 2 - pyridylmethylene) - 5-norbornene-2,3-dicarboximide is >10<30 mg./kg.; and when R′ is hydrogen and one of said R″ and R‴ is bromo, the other being hydrogen, the respective $LD_{50}$ of the corresponding bromo derivative of 5-[α-hydroxy-α - phenyl - α - (α - pyridyl)methyl] - 7 - (phenyl - 2 - pyridyl - methylene)-5-norbornene-2,3-dicarboximide is >30<100 mg./kg. The lethal doses are determined by oral administration of the particular compound in an aqueous suspension of dilute hydrochloric acid solution to female white rats weighing 120–150 grams.

TABLE 1

Rat toxicity of 5-[α-hydroxy-α-phenyl-α-(2-pyridyl)-methyl] - 7 - (phenyl - 2 - pyridylmethylene) - N - R′-5-norbornene-2,3-dicarboximides.

| R′: | $LD_{50}$ (mg./kg.) orally; rats |
|---|---|
| —H [1] | 5.3 |
| —CH₃ [2] | 12.0 |
| —C₂H₅ [2] | 7.5 |
| =n—C₃H₇ [2] | >10<30 |
| =i—C₃H₇ [2] | >10<30 |
| =n—C₄H₉ [2] | 9.0 |
| =sec—C₄H₉ [2] | >30<100 |
| =i—C₄H₉ [2] | >30<100 |
| —CH₂CH=CH₂ [2] | >10<30 |
| —CH₂CH₂OCH₃ [2] | 9.0 |
| —(CH₂)₃N(CH₃)₂ [2] | >30<100 |
| —(CH₂)₂N(CH₃)₂ [2] | >10<30 |
| —CH₂CON(CH₃)₂ [2] | 5.9 |

[1] Mixed isomers.
[2] Endo-isomers only (via n.m.r. spectrum).

Due to the possible different spatial arrangements of their atoms, it is to be understood that the compounds of this invention may be obtained in more than one possible stereoisomeric form. The novel compounds, as described and claimed, are intended to embrace all such isomeric forms. Accordingly, the examples included herein are to be understood as illustrative of particular mixtures of isomers or single isomers and not as limitations upon the scope of the invention.

In the case of the raticidally-active 5-[α-hydroxy-α-phenyl - α - (2 - pyridyl)methyl] - 7 - (phenyl - 2 - pyridylmethylene)-5-norbornene-2,3-dicarboximide, for example, the molecule has four elements of dissymmetry which give rise to eight racemates or sixteen optically active isomers. The following graphic representations of the trans-endo-erythro form of 5-[α-hydroxy-α-phenyl-α - (2 - pyridyl)methyl] - 7 - (phenyl - 2 - pyridylmethylene)-5-norbornene-2,3-dicarboximide will serve to illustrate the stereoisometric aspects of the molecule.

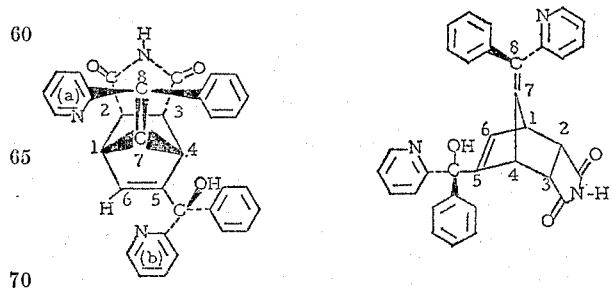

trans-endo-erythro form of 5-[α-hydroxy-α-phenyl-α-(2-pyridy)methyl] - 7 - (phenyl - 2 - pyridylmethylene) - 5-norbornene-2,3-dicarboximide.

As is evident from the above representations, there are five asymmetric carbon atoms: the carbinol carbon and atoms 1,2,3 and 4. Due to the restriction of cis bridging across atoms 1 and 4 and the cis fusion of the carboximide ring at carbons 2 and 3, each of these pairs is equivalent to one asymmetric carbon atom, which, together with the carbinol atom, affords three asymmetric elements, which in turn give rise to eight isomers. Geometric isomerism caused by different substituents on carbon atom 8 doubles the number to 16 isomers or eight racemates. Thus, for example, in describing the isomers of 5-[α-hydroxy-α-phenyl-α - (2 - pyridyl)methyl] - 7-(phenyl-2-pyridylmethylene)-5-norbornene - 2,3 - dicarboximide, the following definitions are used:

(1) endo-exo.—The endo-isomer has its dicarboximide function below the plane described by carbon atoms 2,3,5, and 6 of the norbornene ring on the opposite side of the carbon 7-bridge. The exo-isomer has its dicarboximide function above this plane on the same side as the bridge.

(2) cis-trans.—The isomer in which the pyridyl group (a) attached to carbon atom 8 is one the same side of the molecule as the carbinol group attached to carbon atom 5 is assigned the cis-configuration. The opposite configuration is assigned the trans-configuration.

(3) erythro-threo.—The isomer with the hydroxyl group in the same plane as the methylene double bond (and above the norborne ring as shown in the illustration) and in which the pyridyl group (b) is on the same side as the hydrogen atom on carbon 6 is assigned the erythro configuration. The opposite arrangement of groups about the carbinol carbon atom is assigned the threo configuration.

Proceeding from a mixture of the geometric isomers of α-phenyl-α-[6-phenyl-6-(2-pyridyl) - 2 - fulvenyl] - 2-pyridine methanol by reaction with maleimide, 5-[α-hydroxy-α-phenyl - α - (2 - pyridyl)methyl] - 7 - (phenyl-2-pyridylmethylene) - 5 - norbornene - 2,3 - dicarboximide is obtained as a mixture in which five of the eight possible racemic isomers predominate. These five predominate isomers are separated by either fractional crystallization, various types of chromatography, or both. The other three isomers can be obtained by thermal isomerization of the predominant isomers followed by chromatographic separation. A combination of interrelations demonstrated by thermal and photochemical isomerizations and a study of physical data and, in particular, the nuclear magnetic resonance spectra and the results of an X-ray crystallographic analysis is used to assign structures to the various isomers. These structural assignments along with other data such as melting points, percentage occurrence in the reaction product and rat lethality for the isomers of 5-[α-hydroxy-α-phenyl-α-(2-pyridyl)methyl]-7-(phenyl-2-pyridylmethylene) - 5 - norbornene - 2,3 - dicarboximide are given in Table 2.

When used as rodenticides, the 2,3-dicarboximides may be dissolved in water in the form of their acid addition salts. Advantageously, the compounds may be incorporated, either as bases or as acid addition salts, with a suitable rodenticidal bait such as meat, meat extracts, grain, mash, fruit, vegetables and other known edible materials together with a filler or carrier such as starch, kaolin clay, montmorillonite clay, attapulgite clay, diatomaceous earth, sucrose and similar materials. The final compositions may be in any one of various forms such as solutions, suspensions, emulsions, pastes, powders, granules, tablets, pellets or other convenient forms. The rodenticidally active compounds of this invention are incorporated in the bait formulation to make a final dosage composition of at least 0.001% by weight and which may generally vary from 0.001% to 10%, optimally from 0.1% to 5.0% concentration of the active component.

The advantages of these compositions will be readily apparent to those skilled in the art. The compositions, or the active rodenticide in full or part strength, may be exposed to other animals without endangering their lives, and therefore may be used freely and safely in an environment frequented by domestic animals as well as captive animals such as mink and rabbits.

The novel 5-norbornene-2,3-dicarboximides are prepared by condensation of a fulvene, appropriately substituted with R, $R_1$, $R_2$, $R_3$, $R_4$ and $R_6$, and maleimide or an N-substituted maleimide under Diels-Alder conditions.

N-substituted maleimides are known in the art and are generally prepared by reaction of maleic anhydride with an appropriately substituted amine followed by dehydration of the resulting N-substituted maleamic acid. The fulvene starting materials may be broadly designated as 2-(R-$R_2$-$R_2$-methyl)-($R_6$)-6 - $R_3$ - 6 - $R_4$-fulvenes (VI). When R is hydroxyl, the fulvene starting materials may be denoted as α-$R_1$-α-[(6-$R_3$-6-$R_4$)-($R_6$)-2-fulvenyl]-$R_2$-methanols. When R is hydrogen, the fulvene starting materials may be denoted as α-$R_1$-α-[(6-$R_3$-6-$R_4$)-($R_6$)-2-fulvenyl]-$R_2$-methanes. When R is alkoxy, they may be denoted as α-$R_1$-α-alkoxy-α-[(6-$R_3$-6-$R_4$)-($R_6$)-2-fulvenyl]-$R_2$-methanes. If it is desired to synthesize the novel 5-norbornene-2,3-dicarboxylic anhydrides, the condensation is effected under Diels-Alder conditions using maleic anhydride in place of the maleimide. An $R_6$-substituted maleimide or an $R_6$-substituted maleic anhydride (V) may also be utilized in

(V)

TABLE 2.—STEREOISOMERS OF 5-[α-HYDROXY-α-PHENYL-α-(2-PYRIDYL)-METHYL]-7-(PHENYL-2-PYRIDYLMETHYLENE)-5-NORBORNENE-2,3-DICARBOXIMIDE

| Isomer | Structure | M.P., °C. | Percentage in Mixture | Intravenous $LD_{50}$ in rats, mg./kg. |
|---|---|---|---|---|
| A | dl-cis-endo-threo | 225–226.5 | 26 | 0.15 |
| B | dl-trans-endo-threo | 192–195 | 29 | 0.50 |
| C | dl-cis-endo-erythro | 207–210 | 14 | ca. 1.4 |
| D | dl-trans-endo-erythro | 18 –183 | 16 | 5.0 |
| E | dl-cis-exo } erythro-threo* | 239 | 11 | >10 |
| F | dl-cis-exo } | 188–190 | <1 | >10 |
| G | dl-trans-exo } erythro-threo* | 230–231 | <2 | >8.5 |
| H | dl-trans-exo } | 218–220 | | >8.0 |

*Which isomer of pairs E–F and G–H is erythro or threo has not been determined.

place of the maleimide, in which case, the resulting 5-norbornene-2,3-dicarboximide or 5-norbornene-2,3-dicarboxylic anhydride, respectively, will bear $R_6$ in either the 2- or 3-position. The condensation reaction may be generally represented as follows:

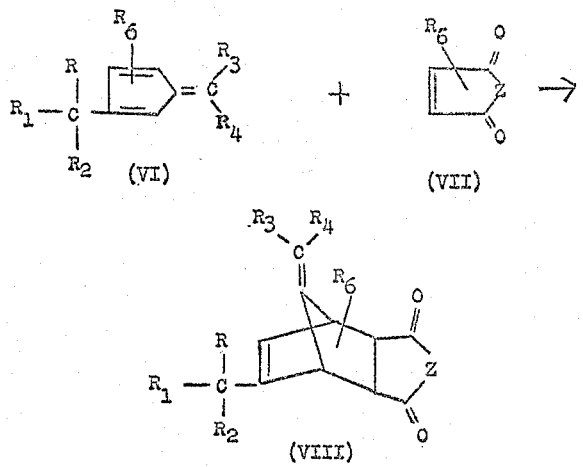

Condensation is generally possible involving a maleimide whose nitrogen atom bears many of the $R_5$ substituents heretofore described, such as with those $R_5$ substituents which will remain unaffected throughout the course of the condensation reaction. Use of an N-$R_5$-maleimide in the condensation reaction is preferred when $R_5$ is alkyl and substituted lower alkyl cycloalkyl, arylcycloalkyl, phenyl and substituted phenyl, amino and substituted amino, ureido and substituted ureido, hydroxy, lower alkoxy, arylkoxy, aryloxy and acyloxy. Introduction of the $R_5$ substituent may also be accomplished, however, and, depending upon the nature of the $R_5$ substituent, may be more advantageous, after the norbornene(-ane) dicarboximide has been obtained. Accordingly, the dicarboximides of this invention, wherein the amido nitrogen atom is unsubstituted, are preferably used for the introduction of such $R_5$ groups as lower alkylcarbonyl, aryl-carbonyl, lower alkoxy-carbonyl, aryloxy-carbonyl, arylkoxy-carbonyl, carbamoyl and N-substituted carbamoyl, nitro and cyano.

When $R_5$ is lower alkenyl, aralkenyl or lower alkynyl, such as allyl, propargyl, cinnamyl, and the like, introduction of such $R_5$ substituents onto the preformed norbornene(-ane) dicarboximide is preferred through akylation by the corresponding halide, such as allyl bromide, propargyl chloride, cinnamyl bromide, and the like. Alternatively, these $R_5$ substituents on the norbornene dicarboximide may be obtained through condensation with the approximately substituted $R_5$-maleimide. When $P_5$ is vinyl or substituted vinyl, condensation with the N-vinyl or N-substituted vinyl maleimide is advantageous.

Alternate routes for synthesizing the desired norbornenes include Diels-Alder condensation of the appropriately substituted fulvenyl methanol with maleic anhydride followed by rupture of the resulting dicarboxylic anhydride with ammonia or an amine to give the acid monoamide which recyclizes to the dicarboximide upon removal of water. Condensation of the fulvenyl methanol with maleamic acid or its esters gives the norbornene acid monoamide directly which is convertible to the dicarboximide as above.

Still another alternative method comprises starting with a bicyclicdiketodicarboximide, reaction with the appropriate diarylmetallic reagents (lithium alkyl or Grignard reagent) to give 5,7-di-(diarylmethylene)norbornane which is then convertible to the desired dicarboximides by known methods.

Alkylation of the unsubstituted imido nitrogen in the novel 5-norbornene(-ane)-2,3-dicarboximides is alternatively accomplished with an appropriate halide such as a lower alkyl halide, e.g., methyl iodide, ethyl bromide, butyl bromide and the like; an unsaturated lower aliphatic or aralkenyl halide, e.g., propargyl chloride, allyl chloride, cinnamyl bromide, and the like; an appropriately substituted lower alkyl halide, e.g., di-lower alkyl-amino-lower alkyl halide, di-lower alkyl-amino-carbonyl-lower alkyl halide, cyclic amino-lower alkyl halide, lower alkoxy-lower alkyl halide, and the like; or with an alkyl ester of an inorganic acid such as dimethylsulfate, diethylsulfate, di-n-butylsulfate, n-butyl-p-toluenesulfonate and the like. The alkylation is carried out in a variety of polar or nonpolar solvents such as the lower alkanols, e.g., methyl alcohol, ethyl alcohol and isopropyl alcohol; ethers; esters; or aromatic hydrocarbons such as benzene, toluene, xylene and the like. The reaction is carried out in the presence of an alkali or alkaline earth metal hydroxide or alkoxide, such as sodium hydroxide, potassium hydroxide, sodium methoxide, sodium ethoxide, etc.

An alternative method of introducing lower alkoxy-carbonyl-lower alkyl onto the imido nitrogen, wherein the attaching lower alkyl moiety comprises at least two carbon atoms between the imido nitrogen and the carbonyl group, is by treatment of the corresponding N-unsubstituted norbornene dicarboximide with a lower alkyl ester, preferably the methyl or ethyl ester, of the appropriate $\alpha$-$\beta$-unsaturated carboxylic acid, e.g., a lower alkyl ester of acrylic acid, methacrylic acid, crotonic acid, 2-methyl-2-butenoic acid, and the like in a suitable inert organic solvent, e.g., anhydrous tetrahydrofuran, 1,4-dioxane, etc., in the presence of a strong base such as sodium alkoxide or a quaternary ammonium hydroxide.

Introduction of a hydroxymethyl group on the unsubstituted imido nitrogen of the novel 5-norbornene(-ane)-2,3-dicarboximides may be effected by treatment with formaldehyde in the presence of a suitable water-organic solvent, e.g., an aqueous solution of formaldehyde and methanol, ethanol, isopropanol, dioxane, benzene, toluene, etc.

Acylation of the unsubstituted imido nitrogen permits the introduction of an $R_5$ group in which the attaching carbon atom is a carbonyl, e.g., lower alkyl-carbonyl, aryl-carbonyl, lower alkoxy-carbonyl, aryloxy-carbonyl, carbamoyl, N-substituted-carbamoyl, and the like. Such acylation is accomplished, preferably under reflux conditions, by first treating the norborene(-ane) dicarboximide with a strongly basic non-hydroxylic agent such as an alkali metal hydride, for example, sodium hydride, lithium hydride, and the like, to form the corresponding alkali metal salt, and then intimately contacting said salt with the appropriate acylating agent, such as an acid halide, preferably the chloride, e.g., lower alkyl-carbonyl-halide, aryl-carbonyl-halide, lower alkoxy-carbonyl halide, etc., in an anhydrous nonhydroxylic organic solvent medium. The anhydride of a lower aliphatic acid, e.g., acetic anhydride, proprionic anhydride, n-butyric anhydride, etc., may also be used advantageously as the acylating agent when introduction of a lower alkyl-carbonyl is desired. Among the anhydrous nonhydroxylic organic solvents operable herein are the dialkylformamides, such as dimethylformamide, diethylformamide and the like, aromatic hydrocarbons such as benzene, toluene, xylene, chlorobenzene, nitrobenzene and the like, mixtures of said dialkylformamides and said aromatic hydrocarbons, tetrahydrofuran and 1,2-dimethoxyethane. Other strong bases that may advantageously be utilized in lieu of the preferred alkali metal hydrides mentioned above are alkali metal amides such as sodamide, lithamide and the like, and alkali metal tertiary alkoxides such as sodium tertiary butoxide, potassium tertiary butoxide and the like. After reaction periods ranging from a few hours to a few days, the reaction mixture is treated with dilute acid and the acylated product is extracted and purified in the conventional manner by suitable organic solvents or by column chromatographic techniques.

The N-nitro norbornene(-ane) dicarboximides of this invention may be prepared by direct nitration of the N-unsubstituted norbornene(-ane) dicarboximide with nitric acid in solvents such as acetic anhydride or 1,2-dimethoxy-ethane (monoglyme).

Saturation of the double bond between the 5- and 6-carbon atoms of the norbornene nucleus and the double bond between the 7-carbon atom of the norbornene nucleus and the $C(R_3)(R_4)$ substituent thereon yields the corresponding norbornane and 7-($R_3$-$R_4$-methyl) derivatives of this invention. Saturation may be accomplished by hydrogenation techniques, for example, with catalytically activated hydrogen, e.g., hydrogen activated by a platinum, palladium or nickel catalyst such as platinum oxide, Raney nickel, etc.

The saturation step may, in many instances, be undertaken either before or after introduction of the $R_5$ group onto the dicarboximido nitrogen, depending upon the nature of the $R_5$ substituent. For example, to obtain the 5-(R-$R_1$-$R_2$-methyl) - 7 - ($R_3$-$R_4$-methyl)-($R_6$)-norbornane-2,3-dicarboximides of this invention, having as the desired $R_5$ substituent a lower alkenyl group, hydrogenation of the corresponding 7-($R_3$-$R_4$-methylene)-5-norbornene compound is advantageously conducted prior to introduction of the lower alkenyl onto the imido nitrogen so as to avoid saturation of the lower alkenyl group as well.

The norbornene(-ane) dicarboxylic anhydrides of this invention may be hydrolyzed to the corresponding dicarboxylic acids, for example, by heating in water with alkali and then acidifying. Base hydrolysis of the norbornene(-ane) dicarboximides results in a rupture of the dicarboximide to give the acid monoamide which, upon further hydrolysis and acidification, affords the corresponding dicarboxylic acid. Alternatively, the acid monoamide or substituted monoamide may be obtained through ammonolysis of the dicarboxylic anhydride with ammonia, or a primary or secondary amine. Similarly, ammonolysis of the dicarboximide yields the corresponding diamide derivative. The di-acid and acid monoamide derivatives may, in turn, be used to prepare the corresponding lower alkyl esters of this invention by conventional esterification techniques, such as by reaction with the appropriate lower alkyl alcohol, preferably in the presence of an acidic catalyst.

The subject norbornene(-ane) dicarboximides, dicarboxylic acids, anhydrides, amides, esters and 7-($R_3$-$R_4$-methyl) derivatives, wherein at least one of $R_1$, $R_2$, $R_3$ and $R_4$ is an azaheterocyclic aryl may, as shown heretofore, be converted to the corresponding acid addition salts, quaternary ammonium compounds and amine oxides. Alternatively, the starting fulvene (VI), wherein at least one of $R_1$, $R_2$, $R_3$ and $R_4$ is an azaheterocyclic aryl, in the form of its corresponding acid addition salt, quaternary ammonium compound or amine oxide, may be used with the desired maleimide or substituted maleimide, maleic anhydride or substituted maleic anhydride under Diels-Alder conditions in preparation of the subject compounds.

The 2-(R-$R_1$-$R_2$-methyl)-($R_6$)-6-$R_3$-6-$R_4$-fulvene starting materials (VI) may be prepared in several ways. For example, the α - $R_1$-α-[(6-$R_1$-6-$R_2$)-($R_6$)-2-fulvenyl]-$R_2$-methanols are obtained by condensation of a ketone of the formula, $R_1$—CO—$R_2$, e.g., phenyl-2-pyridyl ketone, with cyclopentadiene or an $R_6$-substituted cyclopentadiene in the presence of a basic catalyst, such as an alkali metal hydroxide, alcoholate, hydride, or amide; a tertiary amine; a basic ion-exchange resin or a quaternary ammonium hydroxide, and the like, in a suitable organic solvent. Examples of suitable basic catalysts include sodium alkoxides, potassium alkoxides, triethylamine and trimethylbenzyl ammonium hydroxide. Among the organic solvents that are operable herein are aromatic hydrocarbons, such as, for example, benzene, toluene, xylene and the like; lower aliphatic alcohols, such as, for example, methanol, ethanol, 2-propanol, tertiary-butanol and the like; mixture of said aromatic hydrocarbons and said aliphatic alcohols; tetrahydrofuran, 1,2-dimethoxyethane, pyridine, and the like. Following completion of the condensation reaction, the desired α-$R_1$-α-[(6-$R_1$-6-$R_2$)-2-fulvenyl]-$R_2$-methanol is obtained by conventional isolation techniques, e.g., filtration, dilution with water followed by organic solvent extraction, chromatography, etc. A 6-$R_1$-6-$R_2$-fulvene product, which may also be formed during the condensation reaction, may also be isolated by conventional techniques. In the condensation reaction, an $R_6$-substituted cyclopentadiene may be utilized in place of the cyclopentadiene, in which case, the final products will also be appropriately $R_6$-substituted.

In some instances, the condensation reaction between cyclopentadiene or an $R_6$-substituted cyclopentadiene and an $R_1$—CO—$R_2$ compound in the presence of an alkali metal alkoxide in an alcoholic solvent produces the corresponding cyclopentadienyl $R_1$-$R_2$-methanol or the alkali metal salt thereof. Replacement of the alcoholic solvent with a nonhydroxylic solvent, e.g., monoglyme, ether, tetrahydrofuran, etc. and addition of a strong base such as an alkali metal hydride or amide, together with addition of a ketone of the formula, $R_3$—CO—$R_4$, results in the corresponding α-$R_1$-α-[(6-$R_3$-6 - $R_4$) - ($R_6$) - 2-fulvenyl]-$R_2$-methanols.

Another method of obtaining α-$R_1$-α-[(6-$R_3$ - 6 - $R_4$)-($R_6$)-2-fulvenyl]-$R_2$-methanols is by the interaction of a cyclopentadienyl Grignard reagent, e.g., a cyclopentadienyl magnesium halide such as cyclopentadienyl magnesium bromide, with an $R_1$—CO—$R_2$ compound in a nonhydroxylic solvent, preferably at reduced temperatures, to produce the corresponding cyclopentadienyl $R_1$-$R_2$-methanol which, in turn, may be treated with an $R_3$—CO—$R_4$ compound in the presence of a strong base to give the desired fulvenyl methanol. Some α-$R_1$-α-[(6-$R_1$-6-$R_2$-($R_6$)-2-fulvenyl]-$R_2$-methanol, which may also be formed in conjunction with said cyclopentadienyl $R_1$-$R_2$-methanol, may be separated from the latter by conventional techniques, e.g., by fractional crystallization.

The α-$R_1$-α-[(6-$R_3$-6-$R_4$)-($R_6$)-2-fulvenyl] - $R_2$ - methanes are obtained by treating a cyclopentadienyl metal derivative, for example, cyclopentadienyl sodium, with an alkylating agent having the formula, $CH(R_1)(R_2)$—X, wherein X is halo, e.g., benzhydryl chloride, α-methylbenzyl bromide, α-(2-pyridyl)benzyl chloride and the like, in an organic solvent such as ethanol, 1,2-dimethoxymethane, benzene, etc. to give the corresponding $CH(R_1)(R_2)$-substituted cyclopentadiene which is then treated with a ketone of the formula, $R_3$—CO—$R_4$ in the presence of a basic catalyst in a suitable organic solvent to give the desired fulvenyl methane product. In place of cyclopentadienyl sodium, a cyclopentadienyl Grignard reagent, e.g., a cyclopentadienyl magnesium halide, may also be used. In addition, the $CH(R_1)(R_2)$-substituted cyclopentadiene may be prepared by reduction of a 6-$R_1$-6-$R_2$-fulvene, for example with complex metal hydrides, such as lithium aluminum hydride, in an inert anhydrous organic solvent, such as diethyl ether, tetrahydrofuran, the dimethyl ether of diethylene glycol (diglyme), etc.

The α-$R_1$-α-[(6-$R_3$-6-$R_4$)-($R_6$)-2-fulvenyl] - $R_2$ - methanes may be converted into the corresponding α-$R_1$-α-[(6-$R_3$-6-$R_4$)-($R_6$)-2-fulvenyl]-$R_2$-methanols in several ways. For example, α-$R_1$-α-[(6-$R_3$-6-$R_4$)-($R_6$)- 2 - fulvenyl]-$R_2$-methane may be treated with a free radical halogenating agent such as N-bromosuccinimide in a halocarbon solvent, such as carbon tetrachloride or chloroform, to give the corresponding α-$R_1$-α-$R_2$-[(6-$R_3$-6-$R_4$)-($R_6$) - 2-fulvenyl]-halomethane, which, upon hydrolysis, e.g., by water in acetone or dilute alkali metal hydroxides in aqueous alcohol, yields the corresponding α-$R_1$-α-[(6-$R_3$-6-$R_4$)-($R_6$)-2-fulvenyl]-$R_2$-methanol.

Alternatively, α-$R_1$-α-[(6-$R_3$-6-$R_4$)-($R_6$) - 2 - fulvenyl]-$R_2$-methane may be converted to its hexachlorantimonate salt by addition of an antimony pentachloride solution in carbon disulfide to a solution of the fulvenyl methane in carbon disulfide. After about one hour at room temperature, the solvent is evaporated off and water and chloroform are added and the mixture stirred. The resulting fulvenyl methanol is found in the chloroform layer and may be isolated by conventional techniques.

The fulvenyl methanols may also be obtained by hydroxylation of an acetic acid solution of an $\alpha\text{-}R_1\text{-}\alpha\text{-}[(6\text{-}R_3\text{-}6\text{-}R_4)\text{-}(R_6)\text{-}2\text{-}$fulvenyl]$\text{-}R_2\text{-}$methane with chromium trioxide in acetic acid at room temperature for 4–24 hours.

Still another method of synthesizing $\alpha\text{-}R_1\text{-}\alpha\text{-}[(6\text{-}R_3\text{-}6\text{-}R_4)\text{-}(R_6)\text{-}2\text{-}$fulvenyl]$\text{-}R_2\text{-}$methanols consists in the condensation of a $6\text{-}R_3\text{-}6\text{-}R_4\text{-}$fulvene with a $R_1\text{-}CO\text{-}R_2$ compound in the presence of phosphorous oxychloride, concentrated sulfuric acid, or a Lewis acid such as boron trifluoride, etc., in an appropriate solvent such as carbon disulfide, ether, monoglyme and the like.

The $\alpha\text{-}R\text{-}\alpha\text{-}R_1\text{-}\alpha\text{-}[(6\text{-}R_3\text{-}6\text{-}R_4)\text{-}(R_6)\text{-}2\text{-}$fulvenyl]$\text{-}R_2\text{-}$methanes, wherein R is lower alkoxy, may be obtained from the corresponding $\alpha\text{-}R_1\text{-}\alpha\text{-}[(6\text{-}R_3\text{-}6\text{-}R_4)\text{-}(R_6)\text{-}2\text{-}$fulvenyl]$\text{-}R_2\text{-}$methanols. Such may be advantageously accomplished by transforming the hydroxylic function of the fulvenyl methanols into an alkali metal salt, e.g., by treatment with an alkali metal or alkali metal hydride in a suitable monohydroxylic organic solvent such as monoglyme. The resulting alkali metal salt is the alkylated, for example, by treatment with an appropriate alkylating agent such as a lower alkyl halide, e.g., methyl iodide, in a suitable solvent, thereby converting the alkali metal salt into the desired ether.

The following examples are intended to illustrate, but not to limit, the scope of the present invention.

EXAMPLE I

A 5.4 g. sample of a mixture of geometric isomers of $\alpha$ - phenyl - $\alpha$ - [6 - phenyl - 6 - (2 - pyridyl) - 2 - fulvenyl]-2-pyridine methanol and 1.26 g. of maleimide are combined in 25 ml. of benzene and the solution is refluxed for three hours. After thirteen hours standing at room temperature, the solution is refluxed for ninety minutes, then cooled in an ice-bath and filtered to give 5.4 g. of white solid, a mixture of isomers of 5-[$\alpha$-hydroxy-$\alpha$-phenyl - $\alpha$ - (2 - pyridyl) - methyl] - 7 - (phenyl - 2-pyridylmethylene) - 5 - norbornene - 2,3 - dicarboximide. The filtrate is concentrated under reduced pressure to give 0.5 g. of a second crop.

Recrystallization of the first crop four times from ethyl acetate (with removal of small amounts of the insoluble crystalline dl-cis-exo isomer E by filtration) gives 0.75 g. of a constant-melting isomeric mixture, M.P. 193.5–194.5° C., composed of 75% of dl-trans-endo-threo isomer B and 24% of dl-trans-endo-erythro isomer D.

A solution of this mixture of isomers B and D in chloroform-methanol is applied as a narrow strip to 8 x 8 in. glass thin layer chromatographic plates coated with 1 mm. of silica gel G in amounts from 10 to 50 mg. per plate. The plates are then developed in a closed tank containing chloroform:ethyl acetate (3:7) until the solvent has run close to the top of the plate. After drying, the plates er redeveloped 1–5 times depending upon the separation, which is followed by examining the plates under short wavelength ultraviolet light in the dark. The partially separated bands are outlined and the silica gel containing the slower running band is scraped off and the product is eluted with chloroform-methanol. The solvent is evaporated and the process is repeated until the separation is complete. The white crystalline solid is recrystallized from ethyl acetate to give pure dl-trans-endo-threo-5-[$\alpha$-hydroxy - $\alpha$ - phenyl - $\alpha$ - (2 - pyridyl)methyl] - 7 - phenyl-2 - pyridylmethylene) - 5 - norbornene - 2,3 - dicarboximide (isomer B), M.P. 192–195° C.

Removal and elution of the faster running band as described above gives the pure, white crystalline dl-trans-endo - erythro - 5 - [$\alpha$ - hydroxy - $\alpha$ - phenyl - $\alpha$ - (2-pyridyl)methyl] - 7 - (phenyl - 2 - pyridylmethylene) - 5-norbornene-2,3-dicarboximide (isomer D), M.P. 180–183° C.

The second crop of crystals from the reaction mixture above is recrystallized three times from ethyl acetate to give them a constant melting isomeric mixture, M.P. 217–218° C., composed of 62% of dl-cis-endo-threo isomer A and 38% of dl-cis-endo-erythro isomer C.

Preparative thin layer chromatographic separation of this mixture of isomers A and C is carried out in a manner similar to that described above except that the developing solvent is acetic acid: ethyl acetate (5:95). The slower running band contains isomer C which is eluted with chloroform. The chloroform eluate is extracted with dilute sodium hydroxide solution, washed with water, dried over anhydrous magnesium sulfate and evaporated to dryness. After re-chromatographing twice in the same fashion and recrystallizing from ethyl acetate, pure dl-cis-endo - erythro - 5 - [$\alpha$ - hydroxy - $\alpha$ - phenyl - $\alpha$ - (2-pyridyl(methyl] - 7 - (phenyl - 2 - pyridylmethylene) - 5-norbornene-2,3-dicarboximide (isomer C) is obtained as white crystals, M.P. 207–210° C.

The faster running band from above is processed in the same fashion and the product is re-chromatographed using the solvent system acetic acid: chloroform:ethyl acetate (5:20:75). The top half of the faster running band is scraped off of the plate and eluted and processed as before. Recrystallization from methylene chloride-ethyl acetate provides pure, white, crystalline dl-cis-endo-threo - 5 - [$\alpha$ - hydroxy - $\alpha$ - phenyl - $\alpha$ - (2-pyridyl) methyl] - 7 - (phenyl - 2 - pyridylmethylene) - 5 - norbornene-2,3-dicarboximide (isomer A), M.P. 225–226.5° C.

EXAMPLE II

A 1.0 part by weight sample of 5-[$\alpha$-hydroxy-$\alpha$-phenyl-$\alpha$ - (2 - pyridyl)methyl] - 7 - (phenyl - 2 - pyridylmethylene)-5-norbornene-2,3-dicarboximide, 0.13 part by weight of potassium hydroxide, 4 parts by volume of water, and 6.6 parts by volume of ethanol is stirred until solution is complete. A 0.25 part by weight sample of dimethylsulfate is added and the solution is stirred at room temperature for thirty minutes, then at reflux for two hours. The solvents are removed under reduced pressure and the residue is dissolved in benzene. Addition of hexane and cooling gives white crystals of 5-[$\alpha$-hydroxy-$\alpha$-phenyl-$\alpha$-(2-pyridyl)methyl] - 7 - (phenyl - 2 - pyridylmethylene) - N-methyl-5-norbornene-2,3-dicarboximide.

EXAMPLE III 14.1 parts by weight sample of di-2-pyridyl-(6,6-di-2-pyridyl-2-fulvenyl) methanol and 3.7 parts by weight of maleimide is combined in 75 parts by volume of hot benzene and the red solution is refluxed overnight. After addition of hexane and cooling in an ice bath, the supernatent is decanted to leave a gum. This gum is purified by passing a chloroform-ether solution of it through a chromatographic column packed with alumina. Evaporation of the eluate to dryness gives pure 5-[$\alpha$-hydroxy-$\alpha$-(di-2-pyridyl)methyl] - 7 - di-2-(pyridyl-methylene)-5-norbornene-2,3-dicarboximide.

EXAMPLE IV

A 0.39 part by weight sample of $\alpha$-phenyl-$\alpha$-[6-phenyl-6-(4-pyridyl)-fulvenyl]-4-pyridine methanol and 0.09 part by weight of maleimide are combined in 4 parts by volume of benzene and the red solution is refluxed for nineteen hours. After cooling in an ice bath the solid is collected by filtration and recrystallized from 2-propanol-ether to give white crystals of 5-[$\alpha$-hydroxy-$\alpha$-phenyl-$\alpha$-(4-pyridyl)methyl] - 7 - (phenyl-4-pyridylmethylene)-5-norbornene-2,3-dicarboximide, melting point 275° C. (dec.).

EXAMPLE V

A 0.3 part by weight sample of di-3-pyridyl-(6,6-di-3-pyridyl-2-fulvenyl) methanol and 0.81 part by weight of maleimide in 120 parts by volume of xylene are heated under reflux. Following concentration of the solution and cooling, the crystals which form are collected and recrystallized from ethanol to give pure 5-[α-hydroxy-α,α-(di-3-pyridyl)methyl]-7 - (di-3-pyridylmethylene)-5-norbornene-2,3-dicarboximide.

EXAMPLE VI

A 10 parts by weight sample of α-phenyl-α-[6-phenyl-6-(2-pyridyl)-2-fulvenyl]-2-pyridine methanol and 2.7 parts by weight of maleic anhydride are dissolved in 200 parts by volume of benzene with stirring. After standing at room temperature, the crystals which form are collected by filtration. Recrystallization from dioxane gives white crystals of 5-[α-hydroxy-α-phenyl-α-(2-pyridyl)methyl]-7-(phenyl - 2 - pyridylmethylene)-5-norbornene-2,3-dicarboxylic anhydride, melting point 228° C.

EXAMPLE VII

An 8.2 parts by weight sample of a mixture of geometric isomers of α-phenyl-α-[6-phenyl-6-(2-pyridyl)-2-fulvenyl]-2-pyridine methanol and 2.5 parts by weight of N-ethylmaleimide are combined in 20 parts by volume of benzene and the solution is refluxed for one hour. After standing overnight the solution is concentrated to a gum, dissolved in warm ether and this solution is cooled to give 6.2 parts by weight of crystalline solid. The solid is triturated with ether and recrystallized twice from ethyl acetate-ether-petroleum ether (30° C. to 60° C.) to give white crystals of 5-[α-hydroxy - α - phenyl-α-(2-pyridyl)methyl]-7-(phenyl-2 - pyridylmethylene) - N-ethyl-5-norbornene-2,3-dicarboximide, melting point 168° C. to 180° C.

EXAMPLE VIII

To a cold (ice-bath) solution of sodium ethoxide which is prepared by dissolving 0.8 part by weight of sodium metal in 380 parts by volume of absolute ethanol is added 64 parts by weight of phenyl-2-pyridylketone and then 40 parts by weight of freshly distilled cyclopentadiene over twenty minutes. The reaction solution is kept under nitrogen and darkens rapidly during the addition. It is stirred at ice-bath temperature for two hours after which crystals of product begin to appear. After the mixture is stirred for fifteen hours under nitrogen at ice-bath temperature, the crystalline product is separated by filtration. The filtrate contains 6-phenyl-6-(2-pyridyl)-fulvene. The solid product amounts to 49 parts by weight of orange crystals melting at 144° C. to 168° C. One recrystallization from absolute ethanol gives pure α-phenyl-α - [6-phenyl-6-(2-pyridyl)-2-fulvenyl]-2-pyridine methanol as orange prisms at 164° C. to 170° C.

EXAMPLE IX

To a warm (35° C.) solution of sodium ethoxide which is prepared by dissolving 2.3 parts by weight of sodium metal in 150 parts by volume of absolute ethanol is added 18.3 parts by weight of phenyl-4-pyridylketone and then 11.5 parts by weight of freshly distilled cyclopentadiene over twenty minutes. The reaction solution is kept under nitrogen and darkens rapidly during the addition. It is stirred at ice-bath temperature for two hours after which crystals of product begin to appear. After the mixture is stirred for fifteen hours under nitrogen at ice-bath temperature, the crystalline product is separated by filtration. The filtrate contains 6-phenyl-6-(4-pyridyl)fulvene. The solid product amounts to 12.8 parts by weight of orange crystals melting at 192° C. to 195° C. Two recrystallizations (from absolute ethanol) give pure α-phenyl - α - [6 - phenyl-6-(4-pyridyl)-2-fulvenyl]-4-pyridine methanol as orange prisms melting at 206° C. to 209° C.

EXAMPLE X

To a cold (ice-bath) solution of sodium ethoxide which is prepared by dissolving 0.8 part by weight of sodium metal in 380 parts by volume of absolute ethanol is added 64 parts by weight of phenyl-3-pyridylketone and then 40 parts by weight of freshly distilled cyclopentadiene over twenty minutes. The reaction solution is kept under nitrogen and darkens rapidly during the addition. After the mixture is stirred for fifteen hours under nitrogen at ice-bath temperature, the product is separated from the solution. The solution contains 6-phenyl-6-(3-pyridyl)fulvene. The product consists of α-phenyl-α-[6-phenyl-6-(3-pyridyl)-2-fulvenyl]-3-pyridine methanol.

EXAMPLE XI

To a cold (ice-bath) solution of sodium ethoxide which is prepared by dissolving 0.3 part by weight of sodium metal in 100 parts by volume of absolute ethanol is added 25 parts by weight of 2,2-dipyridylketone and then 15.7 parts by weight of freshly distilled cyclopentadiene over twenty minutes. The reaction solution is kept under nitrogen and darkens rapidly during the addition. It is stirred at ice-bath temperature for two hours after which crystals of product begin to appear. After the mixture is stirred for fifteen hours at ice-bath temperature, the crystalline product is separated by filtration. The filtrate contains 6,6-(di-2-pyridyl)fulvene. The solid product amounts to 15 parts by weight of orange crystals melting at 141° C. to 144° C. One recrystallization from ethylacetate gives pure di-2-pyridyl-(6,6-di-2-pyridyl-2-fulvenyl) methanol as orange prisms melting at 146.5° C. to 147.5° C.

EXAMPLE XII 4.14 g. (0.01 mole) of α-phenyl-α-[6-phenyl-6-(2-pyridyl)-2-fulvenyl]-2-pyridinemethanol and 1.53 g. (0.01 mole) of N-n-butylmaleimide is added to 100 ml. of benzene and the solution is refluxed for 24 hours. The solution is then concentrated in vacuo to a red oil which is dissolved in ethyl acetate. Addition of hexane yields 3.2 g. of crystals. Two recrystallizations from ethyl acetate-hexane yields crystalline N-n-butyl-5-[α-hydroxy-α-phenyl - α-(2-pyridyl)methyl]-7-(phenyl-2-pyridylmethylene)-5-norbornene-2,3-dicarboximide; M.P. 171–172° C.

*Analysis.*—Calcd. for $C_{37}H_{33}N_3O_3$: N, 7.40%. Found: N, 7.24%.

EXAMPLE XIII

A solution of 1.55 g. (.01 mole) 2-methoxyethylmaleimide and 4.14 g. (.01 mole) of α-phenyl-α-[6-phenyl-α-(2-pyridyl)-2-fulvenyl]-2-pyridinemethanol in 50 ml. of benzene is refluxed for 42 hours. The reaction mixture is evaporated to half its original volume; petroleum ether is added giving an off-white solid which is recrystallized twice from carbon tetrachloride-petroleum ether to yield white crystalline N - (2 - methoxyethyl)-5-[α-hydroxy-α-phenyl - α - (2-pyridyl)-methyl]-7-[phenyl-(2-pyridyl)methylene] - 5-norbornene-2,3-dicarboximide; M.P. 172–173° C.

*Analysis.*—Calcd. for $C_{36}H_{31}N_3O_4$: C, 75.90; H, 5.49; N, 7.38%. Found: C, 74.86, 75.06; H, 5.48, 5.54; N, 7.23%.

EXAMPLE XIV 10.3 g. (0.025 mole) of α-phenyl-α-[6-phenyl-6-(2-pyridyl)-2-fulvenyl]-2-pyridine methanol and 4.7 g. (0.025 mole) of N-benzylmaleimide are dissolved in 60 ml. of benzene and refluxed for 2 days. After 4 days of refrigeration at 0° C., 6.0 g. of crystals are collected by filtration. Three recrystallizations from chloroform-petroleum ether yields white crystalline N-benzyl-5-[α-hydroxy-α-phenyl-α-(2-pyridyl)methyl]-7-(phenyl-2-pyridylmethylene) - 5-norbornene-2,3-dicarboximide; M.P. 200–201.5°.

EXAMPLE XV 10.3 g. (0.025 mole) of α-phenyl-α-[6-phenyl-6-(2-pyridyl)-2-fulvenyl]-2-pyridine methanol and a 4.5 g.

(0.025 mole) of N-cyclohexylmaleimide are dissolved in 60 ml. of benzene and refluxed for 2 days. After 4 days of refrigeration at 0° C., an 11 g. of crystals are removed by filtration. Three recrystallizations from chloroform-ether yields white crystalline N-cyclohexyl-5-[α-hydroxy-α-phenyl-α-(2-pyridyl)methyl]-7-(phenyl-2 - pyridylmethylene) - 5-norbornene-2,3-dicarboximide; M.P. 198–200° C.

EXAMPLE XVI

A solution of 12.5 g. (0.03 mole) of α-phenyl-α-[6-phenyl-6-(2-pyridyl)-2-fulvenyl]-2-pyridine methanol and 5.2 g. (0.03 mole) of N-phenyl maleimide in 200 ml. of benzene is refluxed for 26 hours. The mixture is cooled and a white solid is filtered off which is recrystallized from benzene-ethyl acetate to yield 5.2 g. of white crystals, M.P. 218–221° C. Two recrystallization from tetrahydrofuran-ether yields white crystalline 5-[α-hydroxy-α-phenyl-α-(2-pyridyl)methyl] - N - phenyl-7-(phenyl-2-pyridylmethylene)-5-norbornene-2,3-dicarboximide; M.P. 225–227° C. (dec.)

*Analysis.*—Calcd. for $C_{38}H_{29}N_3O_3$: C, 79.28; H, 5.08; N, 7.30%. Found: C, 79.50; H, 5.33; N, 7.28%.

EXAMPLE XVII

To 400 ml. of absolute ethanol is added 1.2 g. of sodium metal. After dissolution of the sodium is complete, the flask is cooled to 0–5° C. in an ice-bath. 3.3 g. (0.05 mole) of freshly-distilled cyclopentadiene is added in one portion with stirring. To this solution is added 21.75 g. (0.1 mole) of α-p-chlorobenzoylpyridine. The resultant slurry is stirred overnight and allowed to warm to room temperature. The resulting clear deep-red solution is evaporated to near-dryness under reduced pressure. The viscous dark syrup is taken up in ether (600 ml.) and washed with water (600 ml.). The water layer is extracted 3 times with 250 ml. portions of ether. The combined ether extracts are dried over magnesium sulfate and the ether is removed in vacuo. The resulting orange amorphous solid, α - p-chlorophenyl-α-[6-p-chlorophenyl-6-(2-pyridyl)-2-fulvenyl]-2-pyridine methanol, melted (gradual softening) at 90–108° C.

EXAMPLE XVIII 4.83 g. (0.01 mole) of α-p-chlorophenyl-α -[6-p-chlorophenyl-6-(2-pyridyl)-2-fulvenyl]-2 - pyridine methanol is added to a benzene solution (50 ml.) of maleimide, 1.00 g. (0.01 mole). The reaction mixture is heated under reflux for 18 hours and concentrated in vacuo to about 10 ml. Addition of excess methylcyclohexane precipitated a yellow-grey semisolid mass. The solid is taken up in warm methanol and water is added with continued warming until the cloud point is reached. After cooling to room temperature, the slightly opaque solution is decanted from a yellow gum. This operation is repeated until a colorless supernatant is obtained. Addition of excess water to this supernatant causes the separation of an amorphous white solid which is collected by suction filtration. The purifying operation is repeated to give amorphous 5-[α-hydroxy-α-(2-pyridyl)-α-(p-chlorophenyl)methyl] - 7-[(2 - pyridyl)-p-chlorophenylmethylene] - 5 - norbornene - 2,3 - dicarboximide, M.P. 139–190° C.

EXAMPLE XIX

To a cold (0–5° C.) stirred solution of 0.345 g. of sodium in 300 ml. of absolute ethanol is added 1.0 g. (0.015 mole) of freshly-distilled cyclopentadiene, followed by 7.0 g. (0.03 mole) of 2-benzoylquinoline. The resultant slurry is stirred overnight at 0° C. The reaction mixture is allowed to warm to room temperature with continued stirring. At the end of 3 hours, the reaction mixture becomes homogeneous and acquires a red color. After 3 additional hours, 0.25 g. (0.004 mole) of additional cyclopentadiene is added and the reaction is allowed to proceed for an additional 66 hours at room temperature. A red-orange solid separates from the reaction mixture and is collected by suction filtration and dried in air; M.P. 203.5–204.5° C. (dec.). Two recrystallizations from benzene-cyclohexane yields pure α-phenyl-α-[6-phenyl-6-(2-quinolyl)-2-fulvenyl]-2-quinoline methanol; M.P. 207–207.5° C. (dec.).

EXAMPLE XX

α-Phenyl-α-[6-phenyl-6-(2-quinolyl) - 2 - fulvenyl]-2-quinoline methanol, 514 mg. (1 mmole), is dissolved in 50 ml. of hot benzene. To this clear red solution is added 100 mg. (1 mmole) of maleimide. After solution of the maleimide is complete, the reaction mixture is concentrated to about 30 ml. and allowed to reflux for 12 hours. The hot solution is treated with a large excess of n-hexane with rapid swirling which causes separation of a peach-colored solid. This solid is collected by vacuum filtration, taken up in benzene and treated with n-hexane. For the final purification, the collected reprecipitated solid is dissolved in benzene and treated with activated charcoal. Addition of n-hexane precipitated amorphous 5-[α-hydroxy-α-(2-quinolyl)-phenylmethyl]-7-[(2-quinolyl) - phenylmethylene]-5-norbornene-2,3-dicarboximide as an amorphous white solid; M.P. 146–190° C.

EXAMPLE XXI

To a solution of 2.1 g. (0.03 mole) of dry sodium ethoxide in 400 ml. of pyridine is added 54 g. (0.3 mole) of benzophenone. To this cooled (ice-bath) solution is added 20 g. (0.3 mole) of cyclopentadiene with stirring and the resulting red-brown solution is stirred at 25° C. for 24 hours. It is then concentrated under vacuum, diluted with ether and washed with dilute hydrochloric acid and water, dried over anhydrous magnesium sulfate and concentrated under vacuum. The residual red-brown oil is chromatographed on neutral alumina. After elution of diphenylfulvene and benzophenone with 50% ether in petroleum ether (30–60°), the desired product is eluted with 50% ether in chloroform yielding a red oil which crystallized. Recrystallization from cyclohexane yields α-(6,6-diphenyl-2-fulvenyl)-benzhydrol as orange crystals, M.P. 129–130.5° C.

*Analysis.*—Calcd. for $C_{31}H_{24}O$; C, 90.26; H, 5.86%. Found: C, 89.96; H, 5.99%.

EXAMPLE XXII 1.0 g. (0.0024 mole) of α - (6,6-diphenyl-2-fulvenyl)-benzhydrol is reacted with 0.25 g. (0.0026 mole) of maleimide by refluxing in 60 ml. of benzene for 30 hours. After removal of the solvent, the semi-solid residue is recrystallized four times from cyclohexane-ethyl acetate to yield white crystals of 5-[α-hydroxy-diphenylmethyl]-7-diphenylmethylene-5-norbornene-2,3-dicarboximide; M.P. 210–211° C.

EXAMPLE XXIII

The procedure of Example VII is followed except that an equivalent quantity of N-sec-butylmaleimide and N-i-butylmaleimide, respectively, is used in place of the N-ethylmaleimide used therein to yield, as products, the corresponding N-sec-butyl (M.P., 195–196.5° C.) and N-i-butyl (M.P., 196–198° C.) derivative of 5-[α-hydroxy-α-phenyl-α-(2-pyridyl)methyl]-7-(phenyl-2 - pyridylmethylene)-5-norbornene-2,3-dicarboximide, respectively.

EXAMPLE XXIV

A solution of 10 g. (0.043 mole) of benzhydrylcyclopentadiene, 7.16 g. (0.039 mole) of 2-benzoylpyridine and 0.0043 mole of sodium ethoxide in 100 ml. of ethanol is heated to reflux over 7 minutes and refluxed for 30 minutes. The deep red solution is poured onto ice water containing 90 ml. of dilute hydrochloric acid. The resulting weakly acidic mixture deposits a red gum. The supernatant solution is decanted and extracted with ether-benzene solution. The organic layer is then extracted with water until the water wash becomes neutral. The organic layer is combined with an ether-benzene solution of the red gum and dried over magnesium sulfate. After removal of the drying agent, the solution is evaporated to dryness to give 15 g. of oily product. An 8.3 g. sample of this oil is extracted 3 times within 250 ml. portions of boiling petroleum ether (30–60° C.). The combined extracts are cooled at 0° C. to give clusters of orange needles which are collected by filtration, M.P. 134–136° C., and purified by recrystallization from hexane to give 2-benzhydryl-6-phenyl-6-(2-pyridyl)-fulvene, orange crystals; M.P. 135–136° C.

Analysis.—Calcd. for $C_{30}H_{23}N$: C, 90.64; H, 5.83; N, 3.52%. Found: C, 90.49; H, 5.85; N, 3.77%.

EXAMPLE XXV

A benzene solution of 140 mg. (0.35 millimole) of 2-benzhydryl-6-phenyl-6-(2-pyridyl)-fulvene and 34 mg. (0.35 millimole) of maleimide are allowed to stand at room temperature for 65 hours. The solution is evaporated to dryness and the solid recrystallized from benzene-hexane to afford 130 mg. of white crystals, M.P. 202–6° C. A 0.5 g. sample of this crude imide is boiled up in 100 ml. of ether for 90 minutes; 0.13 g. of insoluble material is removed by filtration. Recrystallization of the insoluble portion from cyclohexane-ether yields a crystalline high melting isomer of 5-benzhydryl-7-(phenyl-2-pyridylmethylene)-5-norbornene-2,3-dicarboximide; M.P. 217–9° C.

The filtrate of the 0.13 g. of insoluble material is concentrated to about 20 ml. and diluted with 10 ml. of petroleum ether (30–60° C.). Cooling and filtration yields 270 mg. of crystals, M.P. 205–207° C. One recrystallization from ether-petroleum ether (30–60° C.) yields a white crystalline low melting isomer of 5-benzhydryl-7-(phenyl - 2 - pyridylmethylene) - 5 - norbornene - 2,3-dicarboximide, M.P. 209–211° C.

Analysis.—Calcd. for $C_{34}H_{26}N_2O_2$: C, 82.57; H, 5.30; N, 5.66%. Found: C, 82.64; H, 5.31; N, 5.65%.

EXAMPLE XXVI 5.47 g. (0.013 mole) or di-2-pyridyl-[6,6-di-4-pyridyl-2-fulvenyl] methanol and 1.26 g. (0.013 mole) of maleimide in 100 ml. of benzene are refluxed for several days. After cooling and filtration, 6.4 g. of solid are obtained. Solution in ethanol and concentration in vacuo yields an amorphous solid, 5-[α-hydroxy-α,α-(di-4-pyridyl)-methyl] - 7 - (di - 4 - pyridylmethylene) - 5 - norbornene - 2,3-dicarboximide; M.P. 240° C.

EXAMPLE XXVII

To a 25 ml. solution of 18% cyclopentadienyl sodium (0.05 mole) in tetrahydrofuran is added 2-acetylpyridine (6.0 g., 0.05 mole) dissolved in 50 ml. of dry monoglyme. The resultant solution is allowed to stand at 5° C. for 21 hours. A 15 ml. portion is withdrawn and worked up by dilution with water and extraction with ether. Drying of the ethereal layer and removal of the solvent leaves an oil which is chromatographed on 40 g. of neutral alumina. An elution of the column with 20% ether in petroleum ether is discarded. A second elution with pure ether, followed by evaporation of the ether, gives α-methyl - α - [6 - methyl - 6 - (2 - pyridyl) - 2 - fulvenyl]-2-pyridinemethanol as a red oil. The procedure of Example III is then followed, using an equivalent quantity of this α-methyl-α-[6-methyl-6-(2-pyridyl)-2-fulvenyl]-2-pyridinemethanol in place of the fulvenyl methanol used therein, to yield the corresponding 5-[α-hydroxy-α-methyl-α - (2 - pyridyl) - methyl] - 7 - (methyl - 2 - pyridylmethylene)-5-norbornene-2,3-dicarboximide, amorphous solid, melting range: 190–210° C.

EXAMPLE XXVIII

To a sodium ethoxide solution, prepared from 2.4 g. of sodium and 15 ml. of ethanol are added 36.6 g. of 2-benzoylpyridine (0.2 mole) and 16 g. (0.2 mole) of methylcyclopentadiene. The reaction mixture is allowed to stand under refrigeration at 0° C. for 3 days. The precipitated orange solid is filtered off, M.P. 139–145° C. Fractional crystallization from 95% ethanol yields 3.2 g. of α - phenyl - α - [6 - phenyl - 6 - (2 - pyridyl) - 3 - methyl-2-fulvenyl]-2-pyridinemethanol as orange crystals; M.P. 167–168° C., (Fulvene isomer A).

Analysis.—Calcd. for $C_{30}H_{24}N_2O$: C, 84.08; H, 5.65; N, 6.54%. Found: C, 84.20; H, 5.70; N (D), 6.41%.

Cooling of the mother liquors of "Fulvene isomer A" followed by recrystallization of the resulting precipitate twice with ethanol and once with hexane yields 4.6 g. of α - phenyl - α - [6 - phenyl - 6 - (2 - pyridyl) - 3 - methyl-2-fulvenyl]-2-pyridine methanol as orange crystals, M.P. 147–148° C., (Fulvene isomer B).

Analysis.—Calcd. for $C_{30}H_{24}N_2O$: C, 84.08; H, 5.65; N, 6.54%. Found: C, 84.11; H, 5.71; N(D), 6.48%.

EXAMPLE XXIX

A 3 g. (0.007 mole) sample of "Fulvene isomer A" is reacted with 0.68 g. (0.007 mole) of maleimide by refluxing in benzene for 50 hours. The resulting solid is filtered and recrystallized from cyclohexane-ethyl acetate to give 1.0 g. of 5-[α-hydroxy-α-(2-pyridyl)-phenylmethyl] - 6 - methyl - 7 - [(2 - pyridyl) - phenylmethylene]-5-norbornene-2,3-dicarboximide as white crystals; M.P. 227–228° C.

Analysis.—Calcd. for $C_{34}H_{27}N_3O_3$: C, 77.69; H, 5.18; N, 8.00%. Found: C, 77.25; H, 5.21; N (D), 7.88%.

EXAMPLE XXX 4.14 g. (0.01 mole) of α-phenyl-α-[6-phenyl-6-(2-pyridyl)-2-fulvenyl]-2-pyridinemethanol is combined with 1.25 g. (0.01 mole) of α-N-α-dimethylmaleimide in 25 ml. of benzene and refluxed for three days. The red solution is concentrated to a small volume and diluted with petroleum-ether (30–60 C.). On cooling, white crystalline N - 2,3(?) - dimethyl - 5 - [α - hydroxy - α - phenyl - α-(2 - pyridyl) - methyl] - 7 - (phenyl - 2 - pyridylmethylene)-5-norbornene-2,3-dicarboximide mixed with orange crystalline α-phenyl-α-[6-phenyl-6-(2-pyridyl)-1-fulvenyl] 2-pyridinemethanol is obtained. The N-2(?)3-dimethyl-5-[α - hydroxy - α - phenyl - α - (2 - pyridyl) - methyl]-7-(phenyl - 2 - pyridylmethylene) - 5 - norbornene - 2,3-dicarboximide is separated mechanically (by tweezers) in low yield, M.P. 141–143° C.

EXAMPLE XXXI 4.14 g. (0.01 mole) of α-phenyl-α-[6-phenyl-6-(2-pyridyl)-2-fulvenyl]-2-pyridinemethanol and 1.32 g. (0.01 mole) of chloromaleic anhydride are added to 100 ml. of benzene and the solution is stirred at room temperature for 20 hours and then heated on a steam bath for 22 hours. After cooling, the slurry is filtered and the filtrate concentrated to dryness in vacuo. The resultant black oil is dissolved in ethyl acetate and after treatment with charcoal is cooled to give a brown solid which is collected by filtration. This solid is stirred in hot chloroform; the insoluble material is removed by filtration, washed with chloroform and ether and dried. The solid 2(?)3 - chloro-5-[α-hydroxy-α-phenyl - α - (2 - pyridyl)-methyl]-7-[phenyl-2-pyridylmethylene] - 5 - norbornene-2,3-dicarboxylic anhydride, M.P. 274° C. (dec.) gives a positive Beilstein test.

EXAMPLE XXXII 10 g. (0.0195 mole) of 5-[α-hydroxy-α-phenyl-α-(2-pyridyl) methyl] - 7-(phenyl-2-pyridylmethylene)-5-norbornene-2,3-dicarboximide in 200 ml. of 0.2 M sodium hydroxide is refluxed for 18 hours. After cooling and filtration, the solution is acidified with glacial acetic acid to pH 8. After extraction with ethyl acetate to remove the yellow color, the aqueous solution is acidified with dilute acetic acid to pH 4.5. After cooling the slurry, 5.5 g. of white solid is collected by filtration. The solid is then dissolved in acetone.

Adidtion of water to the cloud point and cooling caused deposition of a gum which solidified. After decantation and drying, the solid was boiled up in 300 ml. of benzene for 2 hours; the insoluble material is removed by filtration; and the filtrate is cooled to give 1.3 g. of gum which solidifies. This solid is recrystallized from 250 ml. of ether to give 0.26 g. of solid 5-[α-hydroxy-α-phenyl - α - (2 - pyridyl)-methyl]-7-[phenyl-2-pyridylmethylene]-5-norbornene-2,3-dicarboxylic acid; M.P. 161–170° C. (dec.)

*Analysis.*—Calcd. for $C_{33}H_{26}N_2O_5$: N, 5.28%. Found: N, 5.02%.

Non-aqueous titration (sodium methoxide/pyridine/thymol blue) of carboxylic acid groups calculated per 530 M.W.: 2.0; Found: 2.0.

EXAMPLE XXXIII

An 18.3 g. (0.1 mole) sample of 2-benzoylpyridine in 60 ml. glacial acetic acid is reacted with 14.7 ml. of 30% hydrogen peroxide by heating at 60–80° C. with stirring for 12 hours. The reaction is then allowed to stir at room temperature for 16 hours. The solutiotn is distilled under reduced pressure to remove most of the solvent. The residual oil is dissolved in chloroform and washed with potassium carbonate solution, dried over magnesium sulfate and solvent evaporated. The residue crystallizes on cooling and is recrystallized from ethyl acetate-ether to give the white crystalline 2-benzoylpyridine-N-oxide; M.P. 99–100° C.

*Analysis.*—Calcd. for $C_{12}H_9NO_2$: C, 72.35; H, 4.55; N, 7.03%. Found: C, 72.18; H, 4.67; N, 7.31%.

EXAMPLE XXXIV

To a sodium ethoxide solution prepared from 0.63 g. (0.27 g.-atom) of sodium and 60 ml. of ethanol are added 2.5 g. (0.037 mole) of cyclopentadiene and 5.0 g. (0.025 mole) of 2-benzoylpyridine-N-oxide. The resulting solution is allowed to stand under nitrogen at 0° C. for 65 hours. The resulting yellow solid is filtered and recrystallized from aqueous ethanol to give α-phenyl-α-[6-phenyl-6-(2 - pyridyl-N-oxide)-2-fulvenyl]-2-pyridine-N-oxide methanol as yellow crystals; M.P. 220° C. (dec.).

EXAMPLE XXXV

A 2.2 g. (0.005 mole) sample of α-phenyl-α-[6-phenyl-6-(2 - pyridyl-N-oxide)-2-fulvenyl]-2-pyridine-N-oxide methanol is reacted with maleimide (0.48 g., 0.005 mole) by refluxing in 200 ml. of benzene for 26 hours. The solution is concentrated in vacuo and the residue recrystallized from benzene-ether to give 5-[α-hydroxy-α-phenyl-α-(2 - pyridyl - N - oxide)methyl]-7-[phenyl-(2-pyridyl - N - oxide)methylene] - 5 - norbornene - 2,3-dicarboximide as a white solid; M.P. 220° C. (dec.).

EXAMPLE XXXVI

A 1 g. (0.002 mole) sample of 5-[α-hydroxy-α-phenyl-α-(2 - pyridyl) - methyl]-7-(phenyl-2-pyridylmethylene)-5-norbornene-2,3-dicarboximide is hydrogenated in 30 ml. of glacial acetic acid at room temperature, in the presence of 0.4 g. of platinum oxide catalyst at an initial pressure of 39 p.s.i. for 24 hours. After filtration of the catalyst and removal of the solvent, the residue is dissolved in water, made basic with aqueous potassium carbonate and extracted with methylene chloride. Drying and removal of the solvent leaves an oil which crystallizes in benzene-ether. Two recrystallizations from benzene-ether yields a white solid, hydrogenated 5-[α-hydroxy-α-phenyl-α-(2-pyridyl) - methyl] - 7 - (phenyl - 2-pyridylmethylene) - 5 - norbornene - 2,3 - dicarboximide; M.P. 150–170° C.

EXAMPLE XXXVII 6 g. (0.012 mole) of 5-[α-hydroxy-α-phenyl-α-(2-pyridyl) - methyl]-7-(phenyl-2-pyridylmethylene)-5-norbornene-2,3-dicarboximide is allowed to react with a large excess of methyl iodide by refluxing for 4 hours in methanol. After removal of the solvent, the residue is triturated in a mixture of chloroform and ether to give 8.2 g. of a mixture of 5-[α-hydroxy-α-phenyl-α-(2-pyridyl) - methyl]-7-(phenyl - 2 - pyridylmethylene)-5-norbornene-2,3-dicarboximide methiodides as a light yellow amorphous solid, M.P. 190–196° C. (dec.).

EXAMPLE XXXVIII

To a sodium ethoxide solution, prepared by dissolving 0.2 g. of sodium in 350 ml. of absolute ethanol, is added 16.2 (0.088 mole) of di-4-pyridyl ketone. Freshly cracked cyclopentadiene (8 g., 0.12 mole) is added rapidly to the warm suspension of undissolved ketone. A red color formed immediately and the reaction is cooled in an ice bath. After stirring in the cold for 19 hours, the orange crystals are removed by filtration. Two recrystallizations from ethyl acetate-methanol (1:3) yields di-4-pyridyl-(6, 6 - di - 4 - pyridyl-2-fulvenyl)methanol, orange crystals, M.P. 236–238° C.

EXAMPLE XXXIX

An 8.28 g. (0.02 mole) sample of α-phenyl-α-[6-phenyl-6-(2-pyridyl)-2-fulvenyl]-2-pyridinemethanol is combined with 2.78 g. (0.02 mole) of N-n-propylmaleimide in 160 ml. of benzene and the solution is refluxed for 36 hours. The brown solution is concentrated to dryness in vacuo to give an oil which is dissolved in ethyl acetate, diluted with hexane and refrigerated at 0° C. A colorless crystalline solid is removed by filtration and recrystallized three times from ethyl acetate to yield 5-[α-hydroxy-α-phenyl-α-(2-pyridyl)methyl] - 7 - (phenyl-2-pyridylmethylene)-N-n-propyl-5-norbornene-2,3-dicarboximide, white crystals, M.P. 198–200° C.

EXAMPLE XL

An 8.28 g. (0.02 mole) sample of α-phenyl-α-[6-phenyl-6-(2-pyridyl)-2-fulvenyl]-2-pyridinemethanol is combined with 2.78 g. (0.02 mole) of N-isopropylmaleimide in 160 ml. of benzene and the solution is refluxed for 36 hours. The clear orange solution is concentrated to dryness in vacuo to an orange oil which is dissolved in ethyl acetate. Hexane is added to cloud point and the solution refrigerated at 0° C. The resulting crystals are filtered, and, after three recrystallizations from ethyl acetate, the pure crystalline 5-[α-hydroxy - α - phenyl-α-(2-pyridyl)methyl]-N-isopropyl-7-(phenyl-2-pyridylmethylene) - 5-norbornene-2,3-dicarboximide is obtained, M.P. 210–211° C.

EXAMPLE XLI

To a solution of 0.23 g. of sodium in 50 ml. of absolute ethanol is added 5.11 g. (0.01 mole) of 5-[α-hydroxy-α-phenyl-α-(2-pyridyl)methyl] - 7 - (phenyl-2-pyridylmethylene)-5-norbornene-2,3-dicarboximide. The suspension is warmed briefly on the steam bath (loosely stoppered) to effect solution. The solution is filtered to remove a small amount of undissolved solid. To the filtrate is added 1.21 g. (0.01 mole) of allyl bromide and the solution is allowed to stand about thirty minutes. A further 1.21 g. (0.01 mole) of allyl bromide is then added and the solution (basic to pH paper) is heated under reflux until neutral (about two hours). The reactive mixture turns green during this time. Cooling in an ice bath affords green-white crystals which are filtered, taken up in boiling acetone, treated with charcoal and filtered. After concentration and cooling, the crystals are collected and recrystallized twice from acetone affording pure N-allyl-5-[α-hydroxy-α-phenyl-α-(2-pyridyl)methyl] - 7 - (phenyl 2 - pyridylmethylene)-5-norbornene-2,3-dicarboximide as white microscopic needles; M.P. (150) 157–188° C.

EXAMPLE XLII

A sample of 5-[α-hydroxy-α-phenyl-α-(2 - pyridyl)-methyl]-7-(phenyl - 2 - pyridylmethylene)-5-norbornene-2,3-dicarboximide is dissolved in methanol containing an excess of ammonia and the reaction solution is sealed into a glass-lined steel bomb. After standing 18 hours at 100–110° C., the bomb is cooled and the solution removed. Evaporation of the solution to dryness yields crude 5-[α-hydroxy-α-phenyl-α-(2-pyridyl)-methyl]-7-(phenyl - 2 - pyridylmethylene)-5-norbornene-2,3-dicarboxamide.

EXAMPLE XLIII 0.5 g. of 5-[α-hydroxy-α-phenyl-α-(2-pyridyl)-methyl]-7-(phenyl - 2 - pyridylmethylene)-5-norbornene-2,3-dicarboximide is dissolve din 22 ml. of 1.27 N hydrochloric acid to give a solution of the corresponding hydrochloric acid addition salt. The U.V. spectrum showed λ max 240 mμ (ε 16,600), shl. 260 mμ (13,750), 300 mμ (5,950).

EXAMPLE XLIV

Treatment of a solution of 5-[α-hydroxy-α-phenyl-α-(2-pyridyl)-methyl]-7-[phenyl-2-pyridylmethylene] - 5-norbornene-2,3 - dicarboxylic acid in monoglyme with an ethereal solution containing an excess of diazomethane gives, after several hours standing at room temperature and removal of solvent in vacuo, the corresponding dimethyl ester.

EXAMPLE XLV

A 0.5 g. sample of 5-[α-hydroxy-α-phenyl-α-(2-pyridyl) methyl] - 7 - (phenyl-2-pyridylmethylene)-5-norbornene-2,3-dicarboximide is suspended in 10 ml. of 0.1 M potassium hydroxide solution and the mixture heated to boiling for several minutes. In an attempt to effect complete solution, an additional 0.5 ml. of 0.2 N potassium hydroxide is added. The mixture is heated on a steam bath for 90 mins. then at reflux for 3 hours; a small amount of solid remains undissolved. The hot mixture is filtered to remove the undissolved solid. The filtrate is cooled in an ice-bath and acidified to pH 5 with dilute acidic acid. The precipitated solid is refluxed briefly in ether, filtered to remove insolubles and the filtrate cooled to room temperature. Filtration gives 8 mg. of solid. The filtrate is concentrated somewhat causing a solid to precipitate. Addition of a small amount of ether, heating and then cooling yields 5-[α hydroxy-α-phenyl-α-(2-pyridyl)-methyl] - 7 - [phenyl-2-pyridylmethylene]-2(?)3-carbamoyl-5-norbornene-3(?)carboxylic acid, as a white solid, M.P. 150–170° C. (dec.). Non-aqueous titration (sodium methoxide/pyridine/thymol blue) of carboxylic acid groups; Calculated per M.W. of 530: 1.00; Found: 1.16.

EXAMPLE XLVI

A solution of 5-[α-hydroxy-α-phenyl-α-(2-pyridyl)-methyl] - 7 - [phenyl - 2 - pyridylmethylene] - 2(?)3 - carbamoyl-5-norbornene-3(?)2-carboxylic acid in monoglyme is treated with an excess of diazomethane in ether. After standing at room temperature overnight, the solvents are removed in vacuo to give the methyl ester of 5-[α-hydroxy-α-phenyl-α-(2-pyridyl)-methyl]-7-[phenyl-2-pyridylmethylene]-2(?)3-carbamoyl - 5 - norbornene-3(?)2-carboxylic acid.

EXAMPLE XLVII

To 50 ml. of anhydrous ethanol are added 0.46 g. of freshly cut sodium metal. After dissolution of the sodium is complete, 5.11 g. (0.01 mole) of 5-[α-hydroxy-α-phenyl-α-(2-pyridylmethyl)]-7-(phenyl-2 - pyridylmethylene)-5-norbornene-2,3-dicarboximide is added. After the imide has dissolved (warming), 1.58 g. (0.01 mole) of 3-chloro-N,N-dimethylaminopropane hydrochloride is added and the reaction mixture refluxed for forty-eight hours, cooled to room temperature and filtered from undissolved solid. Removal of solvent in vacuo yields a crude product obtained as a light yellow amorphous solid. After two precipitations from cyclohexane the product is purified further by extraction from ether into aqueous hydrochloric acid (5%), washing the acid layer with ether, basification with aqueous potassium carbonate and reextraction into ether. The combined ether extracts are dried over anhydrous magnesium sulfate and filtered. Removal of the ether yields N-(3-dimethyl - aminopropyl)-5-[α-hydroxy-α-phenyl-α-(2-pyridyl)-methyl] - 7 - (phenyl - 2 - pyridylmethylene)-5-norbornene-2,3-dicarboximide as an amorphous solid, M.P. 68–86° C.

EXAMPLE XLVIII

A. To a solution of 51.1 g. (0.1 mole) of 5-[α-hydroxy-α-phenyl-α-(2 - pyridyl)methyl] - 7 - (phenyl - 2 - pyridylmethylene)-5-norbornene - 2,3 - dicarboximide in N,N-dimethylformamide is added 10.8 g. (0.2 mole) of sodium methylate followed by 18.6 g. (0.1 mole) of 2-(4-morpholino)ethyl chloride hydrochloride. After warming on a steam bath for several hours, most of the solvent is removed in vacuo. Dilution with water yields the product, 5-[α-hydroxy-α-phenyl-α-(2-pyridyl)methyl]-7 - (phenyl-2-pyridylmethylene)-N-[2-(4-morpholino)ethyl]-5 - norbornene-2,3-dicarboximide.

B. The procedure of Example XLVIII–A is followed except that, as the cyclic amino-lower alkyl starting material, an equivalent quantity of N-ethyl-2-chloromethylpiperidine hydrochloride and 2-chloromethylquinoline, respectively, is used in place of the 2-(4-morpholino)ethyl chloride hydrochloride used therein to yield, as respective N-(cyclic amino-lower alkyl) substituted products, the N-(2'-N'-ethylpiperidyl)methyl and N-(2-quinolyl)methyl derivative of 5-[α-hydroxy-α-phenyl-α-(2-pyridyl)methyl]-7-(phenyl-2-pyridylmethylene)-5-norbornene-2,3 - dicarboximide.

EXAMPLE XLIX

To a 120 ml. (50—50 ethanol-monoglyme) solution of 4.54 g. (0.02 mole) of p-nitrobenzophenone containing 0.02 mole of sodium ethoxide is added cyclopentadiene (1.2 g.) over a period of 15 min. at 4° C. After 5 hours, the reaction mixture is worked up by concentration, dilution with water and extraction with chloroform. Concentration of the chloroform extracts gives an oil which is chromatographed on neutral alumina. Elution with ether separates 1.8 g. (32% yield) of 6-phenyl-6-(p-nitrophenyl)-fulvene. Elution with 70:30 ether-chloroform separates the fraction containing 3-fulvenylmethanol. This latter portion is rechromatographed to give 0.75 g. (12% yield) of homogeneous α-(p-nitrophenyl)-α-[6-phenyl-6-(p-nitrophenyl)-2-fulvenyl]-benzyl alcohol. A 490 mg. sample of this is reacted with 100 mg. of maleimide by refluxing in benzene for 3 days. The crude product is chromatographed. Starting material is eluted with 20% chloroform-ether. The column is then extracted with methanol. Evaporation of the solvent leaves an amorphous solid which is homogeneous on thin layer chromatography and whose spectral properties are consistent with the structure: 5-[α-hydroxy-α-(p-nitrophenyl)benzyl]-7-[α-(p-nitrophenyl)-benzylidene]-5-norbornene-2,3-dicarboximide.

EXAMPLE L

A. The procedure of Example VI is followed except that, in place of the fulvenyl methanol used therein, an equivalent quantity of the fulvneyl methanol obtained in Examples XI, XIX and XXI, respectively, is reacted with maleic anhydride to yield, as respective products:

5-[α-hydroxy-α,α-di-(2-pyridyl)methyl]-7-(di - 2 - pyridylmethylene)-5-norbornene-2,3-dicarboxylic anhydride;

5-[α-hydroxy-α-phenyl-α-(2-quinolyl)methyl]-7 - phenyl-2-quinolylmethylene)-5-norbornene - 2,3 - dicarboxylic anhydride; and 5-(α-hydroxy-α,α-di-phenylmethyl) - 7 - diphenylmethylene-5-norbornene-2,3-dicarboxylic anhydride.

B. By substituting an equivalent quantity of the fulvenyl methyl ether obtained in Example LIV for the fulvenyl methanol in Example VI, the corresponding 5-[α-methoxy-α-phenyl-α-(2-pyridyl)methyl]-7 - (phenyl-2-pyridylmethylene)-5-norbornene-2,3 - dicarboxylic anhydride is obtained.

C. In accordance with the procedure of Example XLIII, except that an equivalent quantity of the 5-norbornene-2,3-dicarboximide obtained from Examples IV, VII, XX and LIV, respectively, is used in place of the 5-norbornene-2,3-dicarboximide used therein, the corresponding acid addition salts (hydrochlorides) are obtained. The corresponding hydrobromide acid addition salts are obtanied by also substituting hydrobromic acid for the hydrochloric acid in Example XLIII.

EXAMPLE LI

To a solution of 1.2 g. of potassium in 200 ml. of t-butanol is added 15 g. (0.029 mole) of 5-(α-hydroxy-α - 2 - pyridylbenzyl) - 7-(α-2-pyridylbenzylidene)-5-norbornene-2,3-dicarboximide. To the resultant solution is added 3.7 g. (0.03 mole) of N,N-dimethylchloroacetamide in 50 ml. of t-butanol. After stirring at room temperature overnight, the reaction mixture is filtered and the filtrate is concentrated to dryness in vacuo. The residue is dissolved in methylene chloride and precipitated with petroleum ether to provide an amorphous solid which contains a small amount of the starting imide. This solid is retracted with the same quantities as above of potassium t-butoxide and dimethylchloroacetamide and similarly treated. The amorphous solid recovered from this treatment is dissolved in chloroform-ethyl acetate and stirred with basic alumina. Filtration and evaporation to dryness affords 5 - [α-hydroxy-α-phenyl-α-(2-pyridyl)methyl]-7-(phenyl - 2-pyridyl-methylene)-N-dimethylaminocarbonylmethyl - 5 - norbornene - 2,3-dicarboximide monohydrate.

Analysis.—Calcd. for $C_{37}H_{32}N_4O_4 \cdot H_2O$: C, 72.29; H, 5.58; N, 9.12%. Found: C, 72.13, 72.05; H, 5.57 5.60; N, 9.02%.

EXAMPLE LII

A 4.14 g. (0.01 mole) sample of α-phenyl-α-[6-phenyl-6 - (2 - pyridyl)-2-fulvenyl]-2-pyridinemethanol is combined with 1.76 g. (0.01 mole) of α-bromo-maleimide in 100 ml. of benzene. After 24 hours reflux, the black slurry is filtered and the black sludge is triturated with 2-propanol to give a small amount of tan solid. The solid is dissolved in chloroform and treated with charcoal. After filtration, the chloroform is evaporated in vacuo and the resulting oil dissolved in warm methanol. The crystals obtained from the cold methanol solution are recrystallized again from methanol to give white, crystalline 2-(or 3) - bromo - 5-[α-hydroxy-α-phenyl-α-(2-pyridyl)-methyl] - 7 - (phenyl-2-pyridylmethylene)-5-norbornene-2,3-dicarboximide, M.P. 220° C.

Analysis.—Calcd for $C_{33}H_{24}BrN_3O_3$: C, 67.12; H, 4.10; N, 7.12%. Found: C, 67.05; H, 4.50; N, 7.06%.

EXAMPLE LIII

To a solution of 0.058 g. (0.0025 g.-atom) of sodium in 50 ml. absolute ethanol is added 1.28 g. (0.0025 mole) of 5 - [α - hydroxy - α - phenyl - α - (2 - pyridyl)methyl]-7 - (phenyl - 2 - pyridylmethylene) - 5 - norbornene - 2,3-dicarboximide in 50 ml. of hot ethanol and 0.63 g. (0.0025 mole) of p-bromobenzyl bromide. The solution is refluxed for 7 hours and concentrated in vacuo. The residue is dissolved in methylene chloride and water and the layers are separated. The organic solution is dried and concentrated in vacuo to give 1.6 g. of crude crystalline product which is chromatographed over 30 g. of hydrated silicic acid. Elution with 100 ml. portions of ether-chloroform (1:1) gives in the third fraction 1.25 g. of product. Three recrystallizations from methylenechloride-ether and methylenechloride-ethyl acetate affords 5 - [α - hydroxy - α-phenyl - α - (2 - pyridyl)methyl] - 7 - (phenyl - 2 - pyridyl-methylene) - N - (p - bromobenzyl) - 5 - norbornene-2,3-dicarboximide.

EXAMPLE LIV

To a boiling suspension of 5.35 g. of sodium hydride (54% in mineral oil, 0.12 mole) previously washed with anhydrous ether, in 100 ml. of anhydrous monoglyme is added dropwise over 40 minutes a solution of 25 g. (0.06 mole) of α-phenyl - α - [6-phenyl - 6 - (2-pyridyl)-2-fulvenyl]-2-pyridinemethanol in 400 ml. of anhydrous monoglyme. After 1260 ml. (84% of theoretical) of hydrogen has evolved, an additional 0.67 g. of 54% sodium hydride is added. The mixture is cooled and allowed to stand at room temperature overnight and then treated with 8.52 g. (0.06 mole) of methyl iodide in 15 ml. of monoglyme. After 2 hrs. at room temperature, the mixture is refluxed for 30 minutes, cooled and then treated with 15 ml. of absolute ethanol. Addition of water is followed by evaporation to an oily sludge which is partitioned between water and chloroform. The chloroform layer is washed with water and with saturated brine. After drying, the solution is evaporated in vacuo to leave a tar which is triturated with hot ethyl acetate until most of the tar is dissolved. Cooling of the supernatent gives orange crystals which are recrystallized twice from ethyl acetate to give crystalline {α - phenyl - α - [6 - phenyl - 6-(2 - pyridyl) - 2 - fulvenyl] - 2 - pyridyl-methyl} methyl ether, M.P. 178–180° C.

Analysis.—Calcd. for $C_{30}H_{24}N_2O$: N, 6.54. Found: N, 6.51, 6.69.

A solution of 0.5 g. (0.00117 mole) of this ether, and 0.113 g. (0.00117 mole) of maleimide in 40 ml. of benzene is allowed to stand at room temperature overnight. After 3 hrs. reflux, an additional 0.12 g. (0.00118 mole) of maleimide is added. After 25 hours reflux, the solvent is evaporated in vacuo to give a solid, 5-[α-methoxy-α-phenyl-α-(2-pyridyl)-methyl] - 7 - (phenyl-2-pyridylmethylene) - 5 - norborene - 2,3 - dicarboximide, which is recrystallized from benzene.

EXAMPLE LV

To a solution of 0.0015 mole of sodium ethoxide (from 0.34 g. of sodium) and 12.2 g. (0.06 mole) of di-(6-methyl-2-pyridyl)ketone in 40 ml. of absolute ethanol at 5° C. under nitrogen is added dropwise 2 g. (0.03 mole) of freshly distilled cyclopentadiene over a 20 min. period. The resultant slurry is stirred at room temperature for 5 hours until all the solid dissolves. The resulting dark solution is kept at 15° C. for 60 hours. The ethanol is removed in vacuo and the residual red oil is dissolved in chloroform. The chloroform solution is washed four times with water, once with brine, and dried over magnesium sulfate. Removal of the chloroform gives a red oil which is triturated with benzene-cyclohexane to give red crystalline α,α,α',α' - tetra(6-methyl-2-pyridyl)-2-fulvenylmethanol.

A solution of 1.5 g. (0.0032 mole) of α,α,α',α'-tetra-(6-methyl-2-pyridyl)-2-fulvenylmethanol in 30 ml. of benzene is heated under reflux with 0.4 g. (0.004 mole) of maleimide for 18 hours. Removal of the benzene gives a non-crystalline solid which slowly crystallizes from ether-cyclohexane. Three recrystallizations from ether-cyclohexane give white crystalline 5-[α-hydroxy-α,α-di-(6-methyl - 2 - pyridyl)-methyl]-7-[di-(6-methyl-2-pyridyl) methylene] - 5 - norbornene-2,3-dicarboximide, M.P. 100–125° C.

Analysis.—Calcd. for $C_{35}H_{31}N_5O_3$: C, 73.79; H, 5.49; N, 12.30%. Found: C, 73.41; H, 6.10; N, 12.16%.

EXAMPLE LVI

The procedures of Example LIV are followed except that an equivalent quantity of the fulvenyl methanol obtained in Examples XI, XIX and XXI, respectively, is used as the starting material in lieu of the α-phenyl-α-[6 - phenyl - 6 - (2-pyridyl)-2-fulvenyl]-2-pyridinemethanol used therein to yield, as respective products, the methyl ether derivatives of the corresponding 5-norbornene-2,3-dicarboxamides.

EXAMPLE LVII

To an etheral solution of ethyl magnesium bromide prepared from 4.86 g. (0.2 g. atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an additional 30 min., the mixture is hydrolyzed with excess ice water containing 12.0 g. (0.2 mole) of glacial acetic acid. The organic phase is separated and the aqueous phase extracted with three 150–200 ml. portions of ether. The combined extracts are washed with dilute sodium bicarbonate solution and dried over sodium sulfate. Most of the solvent is evaporated in vacuo and the resultant semi-crystalline mass crystallizes upon addition of hexane. The solid filtered, washed with pet ether, and dried to yield α - cyclopentadienyl - α - phenylbenzyl alcohol, M.P. 119–123° C.

EXAMPLE LVIII

α - Cyclopentadienyl-α-phenylbenzyl alcohol (2.48 g., 0.01 mole) and di-2-pyridyl ketone (1.84 g., 0.01 mole) are dissolved in 150 ml. of absolute ethanol. The resulting solution is cooled to 5° C. and 20 ml. of absolute ethanol containing 0.23 g. (0.01 atom) of dissolved sodium are added. After stirring at 5° C. for about two hours, the temperature is allowed to rise to room temperature. The resulting orange solid is filtered off. Fractional recrystallization from acetone-methanol gives the pure product, α,α-di-2-(2-pyridyl)-6,6-diphenyl-2-fulvene methanol, M.P. 146.5–147.5° C.

A mixture of 0.414 g. (1.0 mole) of α,α-di-(2-pyridyl)-6,6-diphenyl-2-fulvene methanol and 0.1 g. (1.0 mole) of maleimide in 10 ml. of benzene is refluxed for about forty-eight hours. Subsequent solvent removal is vacuo affords the product, 5 - [α - hydroxy-α,α-di-(2-pyridyl) methyl] - 7 - (diphenylmethylene)-5-norbornene-2,3-dicarboximide.

EXAMPLE LIX

A solution of 12.4 g. (0.05 mole) of α-cyclopentadienyl-α-phenylbenzyl alcohol and 9.15 g. of 2-benzoyl-pyridine in 60 ml. of absolute methanol is cooled to about 3° C. in an ice-water bath. A solution of 0.46 g. (0.02 g. atom) of sodium in 20 ml. of absolute ethanol is added and the mixture is stirred at ice-bath temperatures for about three hours. The resulting orange solid is collected and washed with ethanol. Recrystallization from acetone-methanol gives the product, α,6,6 - triphenyl-α-(2-pyridyl)-2-fulvene methanol, M.P. 171–173° C. A mixture of 0.414 g. (1.0 mmole) of α,6,6-triphenyl-α-(2-pyridyl)-2-fulvene methanol and maleimide (0.10 g., 1 mmole) in benzene is refluxed for 24 hours. Solvent removal in vacuo gives the product which is crystallized by trituration with acetone. Recrystallization from acetone gives the pure material, 5-[α-hydroxy-α-phenyl-α-(2-pyridyl)-methyl] - 7 - (diphenyl-methylene)-5-norbornene-2,3-dicarboximide, M.P. 205–207° C.

What is claimed is:

1. A chemical compund selected from the group consisting of 5-(R-$R_1$-$R_2$-methyl)-7-($R_3$-$R_4$-methylene)-($R_6$)-5-norbornene-2,3-dicarboximide having the formula:

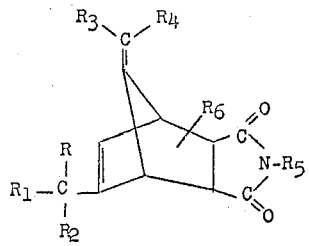

wherein R is a member selected from the group consisting of hydrogen, hydroxy and methoxy; $R_1$ and $R_3$ are each a member selected from the group consisting of lower alkyl, phenyl, halophenyl, nitrophenyl, pyridyl, lower alkyl-pyridyl and quinolyl, provided that, when $R_1$ is lower alkyl, R is other than hydrogen; $R_2$ and $R_4$ are each a member selected from the group consisting of phenyl, halophenyl, nitrophenyl, pyridyl, lower alkyl-pyridyl and quinolyl; $R_6$ is a member selected from the group consisting of hydrogen, lower alkyl and halo; and $R_5$ is a member selected from the group consisting of hydrogen, lower alkyl, cycloalkyl, lower alkenyl, phenyl and a substituted lower alkyl selected from the group consisting of lower alkoxy-lower alkyl, di-(lower alkyl)-amino-lower alkyl, di-(lower alkyl)-amino-carbonyl-lower alkyl, morpholino-lower alkyl, piperidyl-lower alkyl, quinolyl-lower alkyl, phenyl-lower alkyl and halophenyl-lower alkyl; the corresponding 5-(R-$R_1$-$R_2$-methyl)-7-($R_3$-$R_4$-methylene)-($R_6$)-5-norbornene-2,3-dicarboxylic acids and anhydrides; the corresponding amides and lower alkyl esters of said norbornene-2,3-dicarboxylic acids, and the corresponding acid addition salts, quaternary ammonium compounds and amine oxides of the foregoing compounds containing a basic nitrogen.

2. A chemical compound selected from the group consisting of a 5-norbornene-2,3-dicaboximide having the formula:

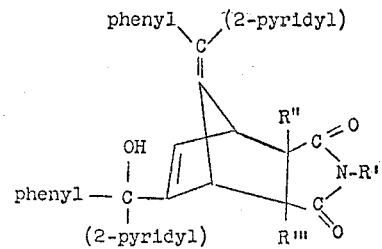

wherein R′ is a member selected from the group consisting of hydrogen, lower alkyl other than tertiary-lower alkyl, lower alkenyl and substituted lower alkyl in which the substituent is a member selected from the group consisting of lower alkoxy, di-(lower alkyl)-amino and di-(lower alkyl)-amino-carbonyl; and R″ and R‴ are each a member selected from the group consisting of hydrogen, lower alkyl and halo, provided that at least one of said R″ and R‴ is hydrogen; and the corresponding acid addition salts thereof.

3. 5 - [α - hydroxy - α - phenyl - α - (2 - pyridyl)methyl] - 7 - (phenyl - 2 - pyridylmethylene) - 5 - norbornene-2,3-dicarboximide.

4. dl - cis - endo - threo - 5 - [α - hydroxy - α - phenyl-α - (2 - pyridyl)methyl] - 7 - (phenyl - 2 - pyridylmethylene)-5-norbornene-2,3-dicarboximide.

5. dl - trans - endo - threo - 5 - [α - hydroxy - α phenyl-α - (2 - pyridyl)methyl] - 7 - (phenyl - 2 - pyridylmethylene)-5-norbornene-2,3-dicarboximide.

6. dl - cis - endo - erythro - 5 - [α - hydroxy - α - phenyl - α - (2 - pyridyl)methyl] - 7 - (phenyl - 2 - pyridylmethylene)-5-norbornene-2,3-dicarboximide.

7. dl - trans - endo - erythro - 5 α - hydroxy - α phenyl - α - (2 - pyridyl)methyl] - 7 - (phenyl - 2 - pyridylmethylene)-5-norbornene-2,3-dicarboximide.

8. The compound according to claim 2 which is 5-[α-hydroxy - α - phenyl - α - (2 - pyridyl)methyl] - 7 - (phenyl - 2 - pyridylmethylene) - N - lower alkyl - 5 - norbornene-2,3-dicarboximide.

9. The compound according to claim 2 which is 5-[α-hydroxy - α - phenyl - α - (2 - pyridyl)methyl] - 7 - (phenyl - 2 - pyridylmethylene) - N - ethyl - 5 - norbornene - 2,3-dicarboximide.

10. The compound according to claim 2 which is 5-[α-hydroxy - α - phenyl - α - (2 - pyridyl)methyl] - 7 - (phenyl - 2 - pyridylmethylene) - N - (lower alkoxy - lower alkyl)-5-norbornene-2,3-dicarboximide.

11. The compound according to claim 2 which is 5-[α-hydroxy - α - phenyl - α - (2 - pyridyl)methyl] - 7 - (phenyl - 2 - pyridylmethylene) - N - (2 - methoxyethyl) - 5-norbornene-2,3-dicarboximide.

12. The compound according to claim 2 which is 5-[α-hydroxy - α - phenyl - α - (2 - pyridyl)methyl] - 7 - (phenyl - 2 - pyridylmethylene) - N - allyl - 5 - norbornene - 2,3-dicarboximide.

13. The compound according to claim 2 which is 5-[α-hydroxy - α - phenyl - α - (2 - pyridyl)methyl] - 7 - (phenyl - 2 - pyridylmethylene) - N - [di - (lower alkyl) - aminolower alkyl]-5-norbornene-2,3-dicarboximide.

14. The compound according to claim 2 which is 5-[α-hydroxy - α - phenyl-α-(2-pyridyl)methyl]-7-(phenyl-2-pyridylmethylene) - N - [di-(lower alkyl)-amino-carbonyl-lower alkyl]-5-norbornene-2,3-dicarboximide.

15. The compound according to claim 2 which is 5-[α-hydroxy - α - phenyl-α-(2-pyridyl)methyl]-7-(phenyl-2-pyridylmethylene) - N - (dimethyl - amino - carbonylmethyl)-5-norbornene-2,3-dicarboximide.

16. The compound according to claim 1 which is 5-[α-hydroxy - α - phenyl-α-(2-pyridyl)methyl]-7-(phenyl-pyridylmethylene)-5-norbornene - 2,3 - dicarboxylic acid.

17. The compound according to claim 1 which is 5-[α-hydroxy-α-phenyl-α-(2-pyridyl)methyl] - 7 - (phenyl-2-pyridylmethylene) - 5 - norbornene-2,3-dicarboxylic anhydride.

18. The compound according to claim 1 which is 5-[α-hydroxy - α - phenyl-α-(2-pyridyl)methyl]-7-(phenyl-2-pyridylmethylene)-5-norbornene-2,3-dicarboxamide.

19. The compound according to claim 1 which is the di-lower alkyl ester of 5-[α-hydroxy - α - phenyl-α-(2-pyridyl)methyl]-7-(phenyl - 2 - pyridylmethylene)-5-norbornene-2,3-dicarboxylic acid.

20. The compound according to claim 1 which is 5-[α-hydroxy - α - phenyl-α-(2-pyridyl)methyl]-7-(phenyl-2-pyridylmethylene) - N - (cyclic amino-lower alkyl)-5-norbornene-2,3-dicarboximide.

21. A member selected from the group consisting of 5-[α - hydroxy - α - phenyl - α - (2-pyridyl)methyl]-7-(phenyl-2-pyridylmethylene) - 2 - carbamoyl-5-norbornene - 3 - carboxylic acid and 5-[α-hydroxy-α-phenyl-α-(2-pyridyl)methyl] - 7 - (phenyl-2-pyridylmethylene)-3-carbamoyl-5-norbornene-2-carboxylic acid.

22. The mono-lower alkyl ester of the acid of claim 21.

23. A member selected from the group consisting of N,2-dimethyl-5-[α-hydroxy - α - phenyl - α - (2-pyridyl)methyl]-7-(phenyl-2-pyridylmethylene) - 5 - norbornene-2,3-dicarboximide and N,3-dimethyl - 5 - [α-hydroxy-α-phenyl-α-(2-pyridyl)methyl] - 7 - (phenyl - 2 - pyridylmethylene)-5-norbornene-2,3-dicarboximide.

References Cited
UNITED STATES PATENTS 3,297,706   1/1967   Hopkins et al. _ _ _ _ _ _ 260—295

OTHER REFERENCES

Rosczkowski et al.: Science, vol. 144, No. 3617, pp. 412–413 (1964).

JOHN D. RANDOLPH, *Primary Examiner.*

WALTER A. MODANCE, *Examiner.*

A. L. ROTMAN, *Assistant Examiner.*

UNITED STATES PATENT OFFICE
CERTIFICATE OF CORRECTION

Patent No. 3,378,566                          April 16, 1968

Richard Joseph Mohrbacher et al.

It is hereby certified that error appears in the above numbered patent requiring correction and that the said Letters Patent should read as corrected below.

Column 4, line 4, "$(R_6-N-R_5-5-$" should read -- $(R_6)-N-R_5-5-$ --. Column 6, TABLE I, second column, line 4 thereof, "$>10<30$" should read -- 34.5 --; line 72, "pyridy" should read -- pyridyl --. Column 7, line 19, "one" should read -- on --. Columns 7 and 8, TABLE 2, third column, line 4 thereof, "18-183" should read -- 180-183 --. Column 9, line 54, "approximately" should read -- appropriately --; line 54, "$P_5$" should read -- $R_5$ --. Column 13, line 62, "er" should read -- are --. Column 20, line 40, "1" should read -- 2 --. Column 21, line 1, "Adidtion" should read -- Addition --; line 22, "solutiotn" should read -- solution --. Column 22, line 12, "16.2" should read -- 16.2g. --. Column 23, line 39, before "refluxed" insert -- removed by filtration. This solid is --; line 46, "3(?)-Carboxylic acid," should read -- 3(?)2-Carboxylic acid --. Column 27, line 45, "di-2-(2-pyridyl)" should read -- di-(2-pyridyl) --; line 50, "is vacuo" should read -- in vacuo --; line 75, "compund" should read -- compound --. Column 29, line 1, "-5 " should read -- -5-[ --; line 37, "(phenyl-pyridyl-methylene)" should read -- (phenyl-2-Pyridylmethylene) --.

Signed and sealed this 9th day of September 1969.

(SEAL)
Attest:

EDWARD M. FLETCHER, JR.                WILLIAM E. SCHUYLER, JR.
Attesting Officer                            Commissioner of Patents